US012760767B2

(12) United States Patent
Kim et al.

(10) Patent No.: US 12,760,767 B2
(45) Date of Patent: Oct. 13, 2026

(54) SYMMETRIC DOUBLE OFFSET CONSTANT VELOCITY JOINT

(71) Applicants: SEOHAN INNOBILITY CO., LTD., Chungcheongbuk-do (KR); KOREA MOVENEX CO., LTD., Ulsan (KR)

(72) Inventors: Sung Hyun Kim, Hwaseong-si (KR); Jeong Lyul Park, Hwaseong-si (KR); Hyo Jin Kim, Hwaseong-si (KR); Yu Gon Ko, Hwaseong-si (KR); Jung Won Choi, Hwaseong-si (KR)

(73) Assignees: SEOHAN INNOBILITY CO., LTD., Chungcheongbuk-do (KR); KOREA MOVENEX CO., LTD., Ulsan (KR)

( * ) Notice: Subject to any disclaimer, the term of this patent is extended or adjusted under 35 U.S.C. 154(b) by 123 days.

(21) Appl. No.: 19/052,282

(22) Filed: Feb. 13, 2025

(65) Prior Publication Data

US 2025/0198468 A1 Jun. 19, 2025

(30) Foreign Application Priority Data

Dec. 14, 2023 (KR) ........................ 10-2023-0182461
Sep. 9, 2024 (KR) ........................ 10-2024-0122085

(51) Int. Cl.
*F16D 3/2237* (2011.01)
*F16D 3/223* (2011.01)

(52) U.S. Cl.
CPC .. *F16D 3/2237* (2013.01); *F16D 2003/22303* (2013.01); *F16D 2003/22309* (2013.01)

(58) Field of Classification Search
CPC ... F16D 3/20; F16D 3/22; F16D 3/223; F16D 3/2233; F16D 3/2237; F16D 3/224;
(Continued)

(56) References Cited

U.S. PATENT DOCUMENTS 7,001,281 B2 * 2/2006 Krude .................. F16D 3/2237 464/145
7,025,683 B2 * 4/2006 Schwarzler ............ F16D 3/229 464/145

(Continued)

FOREIGN PATENT DOCUMENTS

DE 19507859 A1 * 9/1996 ............ F16D 3/224
DE 10210305 A1 * 12/2002 ............. F16C 3/035

(Continued)

*Primary Examiner* — Jonathan P Masinick
(74) *Attorney, Agent, or Firm* — Park, Kim & Suh, LLC

(57) ABSTRACT

The present disclosure provides a symmetric double offset constant velocity joint comprising: an outer race having an outer race track formed on its inner surface; an inner race having an inner race track formed on its outer surface; balls disposed between the outer race and the inner race; and a cage disposed between the outer race and the inner race for supporting the balls, wherein the outer race track includes an outer race linear track, an outer race outer curved track formed outside the outer race linear track, and an outer race inner curved track formed inside the outer race linear track, wherein the inner race track includes an inner race linear track, an inner race outer curved track formed outside the inner race linear track, and an inner race inner curved track formed inside the inner race linear track, wherein the center point of the outer race outer curved track, the center point of the outer race inner curved track, the center point of the inner race outer curved track, and the center point of the inner race inner curved track are arranged on an offset eccentric axis line spaced apart from the central axis of the outer race by a first distance in a vertical direction.

19 Claims, 36 Drawing Sheets

(58) Field of Classification Search
CPC ......... F16D 3/2245; F16D 2003/22303; F16D 2003/22306; F16D 2003/22309
See application file for complete search history.

(56) References Cited

U.S. PATENT DOCUMENTS

| | | | | |
|---|---|---|---|---|
| 7,097,567 | B2 * | 8/2006 | Kobayashi | F16D 3/2237 464/145 |
| 7,357,724 | B2 * | 4/2008 | Nakagawa | F16D 3/2237 464/145 |
| 7,547,254 | B2 * | 6/2009 | Nakagawa | F16D 3/2237 464/145 |
| 7,632,189 | B2 * | 12/2009 | Schwarzler | F16D 3/2233 464/145 |
| 8,096,887 | B2 * | 1/2012 | Oh | F16D 3/2245 464/145 |
| 8,267,802 | B2 * | 9/2012 | Kobayashi | F16D 3/2245 464/145 |
| 8,292,749 | B2 * | 10/2012 | Hoshino | F16D 3/223 464/145 |
| 8,814,711 | B2 * | 8/2014 | Kim | F16D 3/2245 464/145 |
| 10,066,674 | B2 * | 9/2018 | Hirukawa | F16D 3/224 |
| 10,837,498 | B2 * | 11/2020 | Fujio | F16D 3/2245 |
| 12,429,095 | B2 * | 9/2025 | Suzuki | F16D 3/227 |
| 2024/0426348 | A1 * | 12/2024 | Kobayashi | F16D 3/223 |
| 2025/0207641 | A1 * | 6/2025 | Kobayashi | F16D 3/2245 |

FOREIGN PATENT DOCUMENTS

| | | | | | |
|---|---|---|---|---|---|
| DE | 102004009519 | A1 | * | 12/2004 | B22F 5/00 |
| DE | 102004018777 | A1 | * | 3/2005 | F16D 3/224 |
| DE | 10345989 | A1 | * | 6/2005 | F16D 3/223 |
| DE | 102007048327 | A1 | * | 4/2009 | F16D 3/2237 |
| DE | 102013003859 | A1 | * | 9/2014 | F16D 3/223 |
| GB | 518838 | A | * | 3/1940 | F16D 3/2265 |
| KR | 100645274 | B1 | * | 11/2006 | F16D 3/2237 |
| KR | 10-2011-0125107 | A | | 11/2011 | |
| KR | 10-1614389 | B1 | | 4/2016 | |
| KR | 102201203 | B1 | * | 1/2021 | F16D 3/223 |
| KR | 20220049931 | A | * | 4/2022 | F16D 3/223 |
| KR | 10-2023-0104099 | A | | 7/2023 | |
| KR | 20230111502 | A | * | 7/2023 | F16D 3/2237 |

* cited by examiner

Center point of the outer race track with skew angle

Center point of the inner race track with skew angle

SYMMETRIC DOUBLE OFFSET CONSTANT VELOCITY JOINT

CROSS-REFERENCE TO RELATED APPLICATION

This application is based on and claims priority under 35 U.S.C. § 119 to Korean Patent Application No. 10-2023-0182461, filed on Dec. 14, 2023, and Korean Patent Application No. 10-2024-0122085, filed on Sep. 9, 2024 in the Korean Intellectual Property Office, the disclosure of which is incorporated by reference herein in its entirety.

TECHNICAL FIELD

The present disclosure relates to a symmetric double offset constant velocity joint, and more particularly to a symmetric double offset constant velocity joint wherein the outer race track and inner race track are double-offset with respect to the joint center while having symmetrical center points relative to each other, thereby increasing the depth at which each track embraces the balls to prevent track deformation.

BACKGROUND

Generally, constant velocity joints are used to transmit rotational power (torque) between rotational axes at different angles, wherein hook joints or flexible joints are used for propeller shafts with small power transmission angles, while constant velocity joints are used for drive shafts of front-wheel drive vehicles with large power transmission angles.

Constant velocity joints are primarily used in axle shafts of front-wheel drive vehicles with independent suspension systems as they can smoothly transmit power at constant velocity even with large intersection angles between driving and driven shafts, wherein the engine side (inboard side) of the shaft comprises a tripod-type constant velocity joint, and the tire side (outboard side) of the shaft comprises a ball-type constant velocity joint.

The ball-type constant velocity joint installed on the wheel side (outboard side) of the shaft comprises, as disclosed in Korean Patent Publication No. 10-2011-0125107: a shaft that rotates while receiving rotational power from the tripod-type constant velocity joint; an inner race connected and installed at one end of the shaft; an outer race installed on the exterior of the inner race; a plurality of balls for transmitting power to the outer race; a cage for supporting the balls; a sensor ring installed on the exterior of the outer race; a boot having one end connected to the shaft and another end connected to the outer race; and a clamping band for securing the boot.

The conventional ball-type constant velocity joint of a vehicle has a structure wherein the cage and inner race secure the balls, and the balls move within grooves formed longitudinally on the inner circumferential surface of the outer race according to steering movement A technology of some conventional apparatuses has been disclosed for measuring the flatness of a substrate by measuring the current and voltage of a pair of electrodes located inside a chamber to measure impedance. However, these conventional apparatuses directly measure the voltage and current to calculate impedance, and thus have a difficult to accurately determine a warpage degree of the substrate due to a change in voltage and current.

However, with the recent introduction of electric vehicles, there has been an increase in required driving torque, and in vehicle types requiring constant velocity joints capable of high angular articulation during full turn steering, a problem has occurred wherein track deformation occurs under high angular articulation conditions, resulting in abnormal noise due to contact between the inner and outer diameters of the cage.

As shown in FIG. 12, with respect to the joint center, the PCD trajectory of the inner race track has a linear shape inside the vertical line passing through the center point of the inner race track, and has a curved shape outside thereof.

And, the PCD trajectory of the outer race track has a linear shape inside the vertical line passing through the center point of the outer race track, and has a curved shape outside thereof.

As shown in FIG. 13, with respect to the joint center point positioned on the central axis line of the outer race, the center of the outer race track has an offset by a first distance horizontally outward from the joint center, and the center of the inner race track has an offset by the first distance horizontally inward from the joint center.

When a high angular articulation (e.g., 47 degrees) is implemented in this structure, as shown in FIG. 14, there has been a problem wherein deformation occurs either in the inner portion (curved portion of the outer race track) of the outer race, or in the inner portion (linear portion of the inner race track) of the inner race.

SUMMARY

The present disclosure provides a symmetric double offset constant velocity joint comprising: an outer race having an outer race track formed on its inner surface; an inner race having an inner race track formed on its outer surface; balls disposed between the outer race and the inner race; and a cage disposed between the outer race and the inner race for supporting the balls, wherein the outer race track includes an outer race linear track, an outer race outer curved track formed outside the outer race linear track, and an outer race inner curved track formed inside the outer race linear track, wherein the inner race track includes an inner race linear track, an inner race outer curved track formed outside the inner race linear track, and an inner race inner curved track formed inside the inner race linear track, wherein the center point of the outer race outer curved track, the center point of the outer race inner curved track, the center point of the inner race outer curved track, and the center point of the inner race inner curved track are arranged on an offset eccentric axis line spaced apart from the central axis of the outer race by a first distance in a vertical direction.

The present disclosure provides a symmetric double offset constant velocity joint wherein, in a state where the joint is not angularly articulated, the outer race linear track is arranged to face the inner race outer curved track, and the inner race linear track is arranged to face the outer race inner curved track.

In the present disclosure, the joint center point is positioned on the central axis of the outer race, wherein the joint center point is defined as the center point of a virtual constant velocity plane (homokinetic plane) formed by the center points of the balls, and wherein the center point of the outer race inner curved track has a horizontal offset by the first distance horizontally outward with respect to the joint center point and a vertical offset by the first distance vertically in a direction opposite to the outer race track.

In the present disclosure, the center point of the outer race outer curved track is spaced apart from the center point of the outer race inner curved track by a horizontal offset of the first distance horizontally outward along the offset eccentric axis line.

In the present disclosure, the joint center point is positioned on the central axis of the outer race, wherein the center point of the inner race outer curved track is spaced apart from the joint center point by a horizontal offset of the first distance horizontally inward, and is spaced apart by a vertical offset of the first distance vertically in a direction opposite to the inner race track.

In the present disclosure, the center point of the inner race inner curved track is spaced apart from the center point of the inner race outer curved track by a horizontal offset of the first distance horizontally inward along the offset eccentric axis line.

In the present disclosure, the arrangement section of the inner race linear track corresponds to the section between the center point of the inner race outer curved track and the center point of the inner race inner curved track, and has a length of the first distance, and the arrangement section of the outer race linear track corresponds to the section between the center point of the outer race outer curved track and the center point of the outer race inner curved track, and has a length of the first distance.

Also, the present disclosure provides a symmetric double offset constant velocity joint comprising: an outer race having an outer race track formed on its inner surface; an inner race having an inner race track formed on its outer surface; balls disposed between the outer race and the inner race; and a cage disposed between the outer race and the inner race for supporting the balls, wherein the outer race track includes an outer race linear track, an outer race outer curved track formed outside the outer race linear track, and an outer race inner curved track formed inside the outer race linear track, wherein the inner race track includes an inner race linear track, an inner race outer curved track formed outside the inner race linear track, and an inner race inner curved track formed inside the inner race linear track, wherein the facing outer race track and inner race track maintain an intersecting state by being disposed obliquely at a predetermined skew angle with respect to the rotational center axis of the joint, and wherein the center point of the outer race outer curved track, the center point of the outer race inner curved track, the center point of the inner race outer curved track, and the center point of the inner race inner curved track are arranged on an offset eccentric axis line spaced apart from the central axis of the outer race by a first distance in a vertical direction.

In the present disclosure, the outer race track includes a first outer race track and a second outer race track arranged adjacent thereto, wherein the inner race track includes a first inner race track and a second inner race track arranged adjacent thereto, wherein the first inner race track is disposed obliquely in a first direction with respect to the rotational center axis line of the joint to form an inner race track skew angle, and the first outer race track facing the first inner race track is disposed obliquely in a second direction symmetrical to the first direction with respect to the rotational center axis line to form an outer race track skew angle, wherein the second inner race track arranged adjacent to the first inner race track is disposed obliquely in the second direction with respect to the rotational center axis line of the joint to form an inner race track skew angle, and wherein the second outer race track facing the second inner race track is disposed obliquely in the first direction symmetrical to the second direction.

In the present disclosure, the inner race linear track is formed in a direction perpendicular to a virtual extension line formed along the inner race track skew angle, and the outer race linear track is formed in a direction perpendicular to a virtual extension line formed along the outer race track skew angle.

In the present disclosure, the inner race linear track is disposed between an inner race linear track outer boundary line forming a boundary with the inner race outer curved track and an inner race linear track inner boundary line forming a boundary with the inner race inner curved track, wherein the inner race track skew angle is formed with reference to the inner race linear track outer boundary line.

In the present disclosure, the outer race linear track is disposed between an outer race linear track outer boundary line forming a boundary with the outer race outer curved track and an outer race linear track inner boundary line forming a boundary with the outer race inner curved track, wherein the outer race track skew angle is formed with reference to the outer race linear track inner boundary line.

In the present disclosure, in a state where the joint is not angularly articulated, the outer race linear track faces the inner race outer curved track, and the inner race linear track faces the outer race inner curved track.

In the present disclosure, the center point of the inner race inner curved track is the starting point of the inner race track skew angle, and the center point of the outer race inner curved track is the starting point of the outer race track skew angle.

In the present disclosure, the X-axis section between the center point of the outer race outer curved track and the center point of the outer race inner curved track is equal to the X-axis section of the outer race linear track.

In the present disclosure, the X-axis section between the center point of the inner race outer curved track and the center point of the inner race inner curved track is equal to the X-axis section of the inner race linear track.

In the present disclosure, the joint center point is positioned on the central axis of the outer race, wherein the joint center point is defined as the center point of a virtual constant velocity plane (homokinetic plane) formed by the center points of the balls.

The center point of the outer race inner curved track, which is also the starting point of the outer race track skew angle, has a horizontal offset by the first distance horizontally outward with respect to the joint center point and a vertical offset by the first distance vertically in a direction opposite to the outer race track.

In the present disclosure, the center point of the outer race outer curved track has a horizontal offset by the first distance horizontally outward along the offset eccentric axis line with respect to the center point of the outer race inner curved track.

In the present disclosure, the joint center point is positioned on the central axis of the outer race, wherein the center point of the outer race outer curved track, which is also the starting point of the inner race track skew angle, has a horizontal offset by the first distance horizontally inward with respect to the joint center point and a vertical offset by the first distance vertically in a direction opposite to the inner race track.

The center point of the inner race inner curved track has a horizontal offset by the first distance horizontally inward along the offset eccentric axis line with respect to the center point of the inner race outer curved track.

In the present disclosure, the arrangement section of the inner race linear track corresponds to the section between the center point of the inner race outer curved track and the center point of the inner race inner curved track, and has a length of the first distance.

The arrangement section of the outer race linear track corresponds to the section between the center point of the outer race outer curved track and the center point of the outer race inner curved track, and has a length of the first distance.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
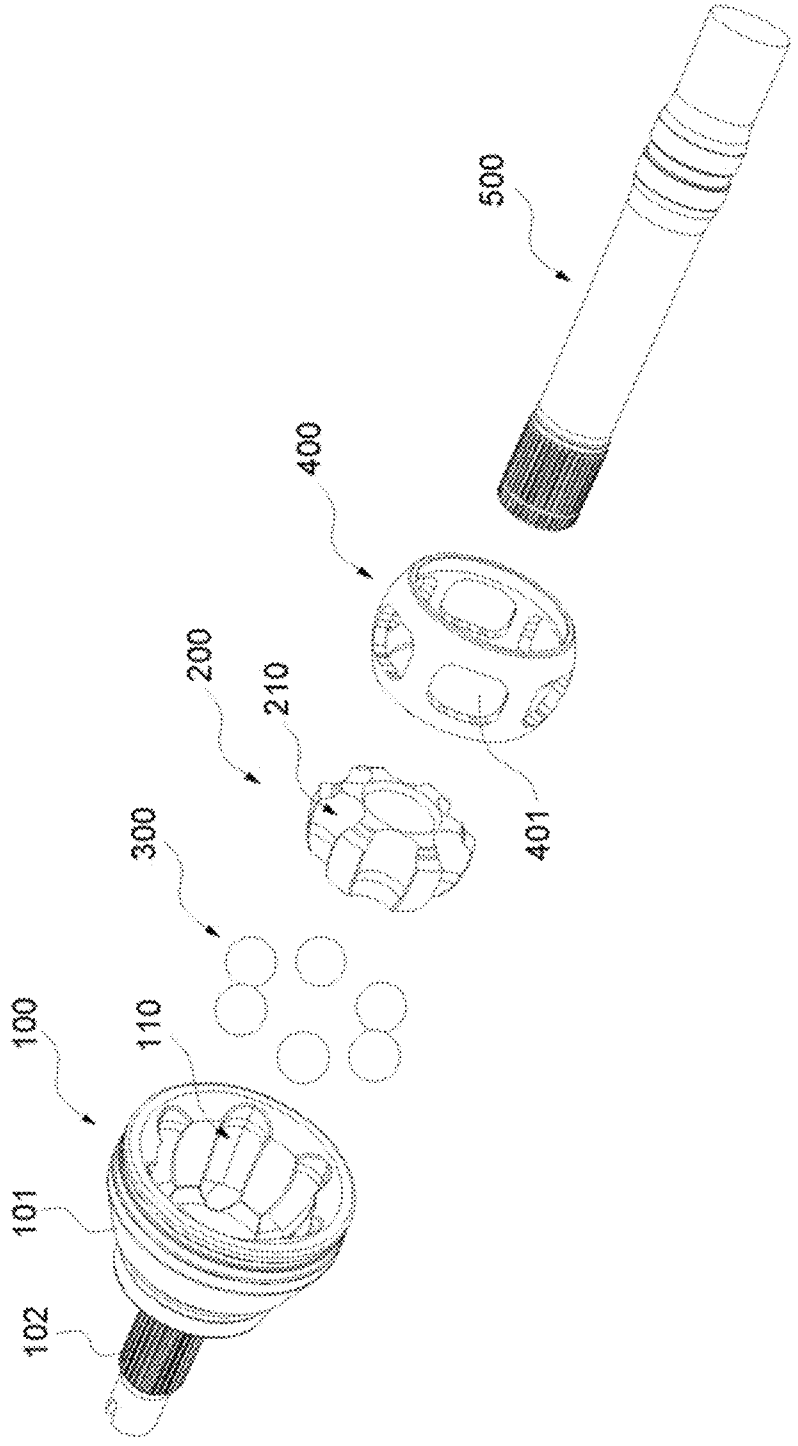
FIG. 1 is an exploded perspective view of a first embodiment of the present disclosure.

The present disclosure may be subject to various modifications and may have various embodiments, and specific embodiments will be illustrated and described in the drawings.

However, this is not intended to limit the present disclosure to specific embodiments, and it should be understood to include all modifications, equivalents, or alternatives falling within the spirit and technical scope of the present disclosure.

Terms including ordinal numbers such as "first," "second," etc., can be used to describe various components, but said components are not limited by these terms.

These terms are used only for the purpose of distinguishing one component from another component.

For example, without departing from the scope of the present disclosure, a second component could be termed a first component, and similarly, a first component could be termed a second component.

The term "and/or" includes any and all combinations of one or more of the associated listed items.

When a component is referred to as being "connected" or "coupled" to another component, it should be understood that it may be directly connected or coupled to the other component, but that intermediate components may also be present.

Conversely, when a component is referred to as being "directly connected" or "directly coupled" to another component, it should be understood that there are no intermediate components present.

The terminology used herein is for the purpose of describing particular embodiments only and is not intended to limit the disclosure.

Singular expressions include plural expressions unless the context clearly dictates otherwise.

In this application, the terms "comprise" or "have" are intended to indicate the existence of features, numbers, steps, operations, components, parts or combinations thereof described in the specification, and should be understood not to preclude the possibility of the existence or addition of one or more other features, numbers, steps, operations, components, parts or combinations thereof.

Hereinafter, embodiments will be described in detail with reference to the accompanying drawings, wherein the same or corresponding components are given the same reference numerals regardless of the figure numbers and redundant descriptions thereof will be omitted.

As shown in FIG. 1, the constant velocity joint according to the first embodiment of the present disclosure may comprise: an outer race 100 having a cup portion 101 and connected to a shaft 102 that transmits rotational force to a vehicle wheel; an inner race 200 provided inside the outer race; a plurality of balls 300 provided between the outer race and the inner race 200; and a cage 400 supporting the balls 300 to help maintain the balls 300 in a constant velocity plane (homokinetic plane).

Although FIG. 1 shows six balls 300, the quantity may not be limited thereto.

The inner surface of the cup portion 101 may be provided with outer race tracks 110, the number of which may correspond to the number of balls.

Also, inner race tracks 210 may be provided on the outer circumferential surface of the inner race 200, corresponding to the number of balls and facing each outer race track 110.

The cage 400 may be provided with windows 401 into which each ball 300 may be inserted, and when the constant velocity joint is angularly articulated, the constant velocity plane (homokinetic plane) of the balls 300 may be maintained by the cage 400.

Figure 2A:
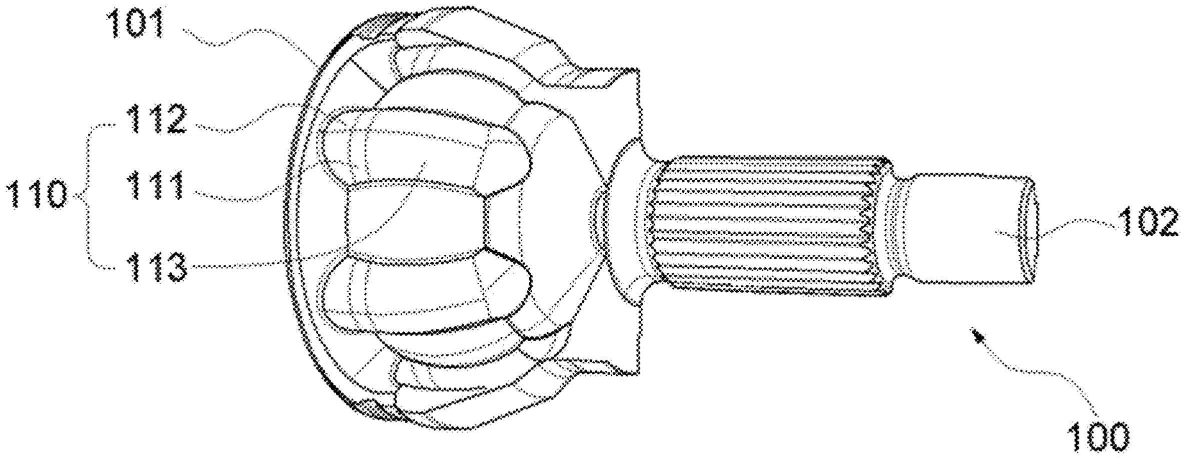
FIG. 2A is an internal structural view of the outer race in the first embodiment of the present disclosure.
Figure 2B:
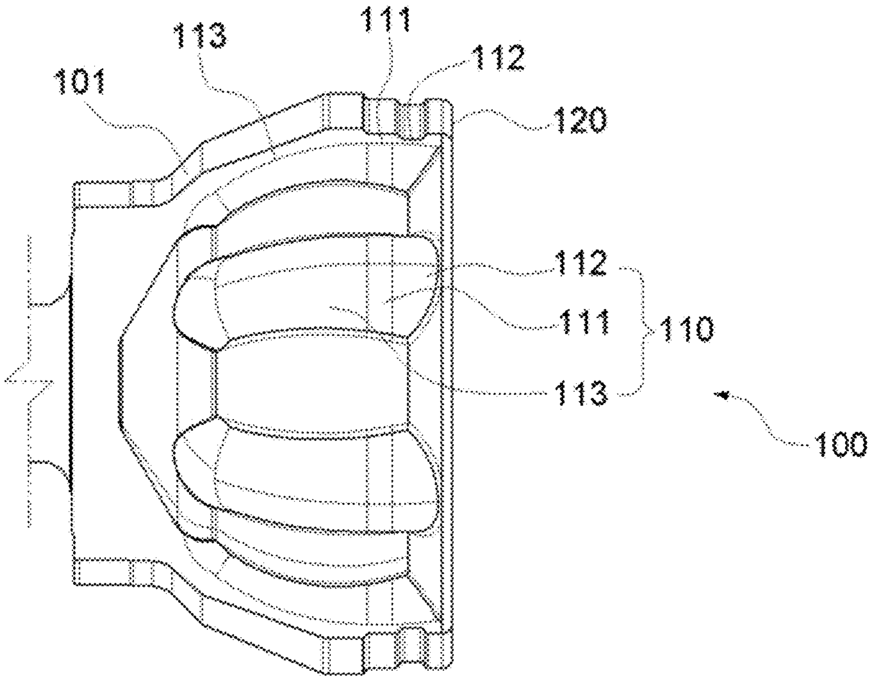
FIG. 2B is a side sectional view of the outer race in the first embodiment of the present disclosure.

As shown in FIGS. 2A and 2B, outer race tracks 110 may be formed on the inner circumferential surface of the outer race 100, all opening toward the outer direction of the cup portion 101. The side sectional shape of the outer race tracks 110 may be formed in a linear shape.

The outer race track 110 may comprise an outer race linear track 111, an outer race outer curved track 112, and an outer race inner curved track 113.

The outer race outer curved track 112 may be formed outside the outer race linear track 111 and may be formed as a curved surface slightly inclined downward toward the outside.

The outer race inner curved track 113 may be formed inside the outer race linear track 111 and may be formed as a curved surface inclined downward toward the inside of the cup portion 101.

The length of the outer race inner curved track 113 may preferably be formed longer than that of the outer race outer curved track 112.

When the constant velocity joint is not angularly articulated, the outer race linear track 111 may preferably be configured as a horizontal linear track arranged in a horizontal direction.

Figure 3A:
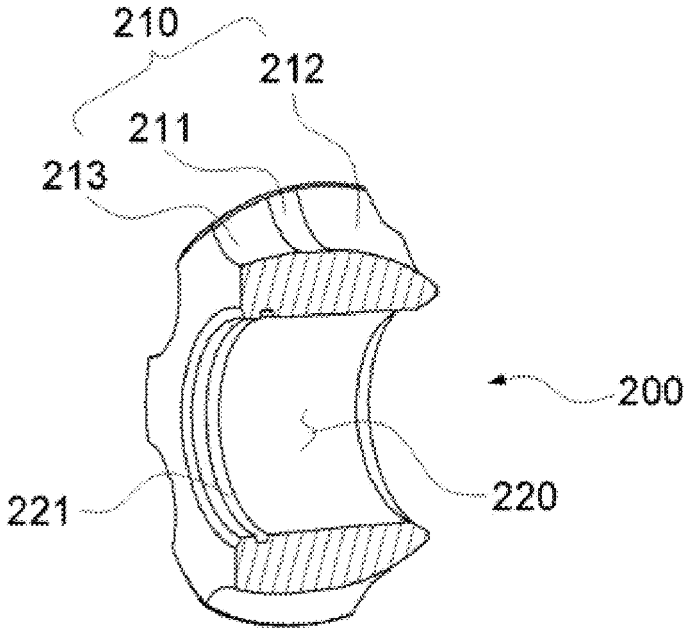
FIG. 3A is an external structural view of the inner race in the first embodiment of the present disclosure.
Figure 3B:
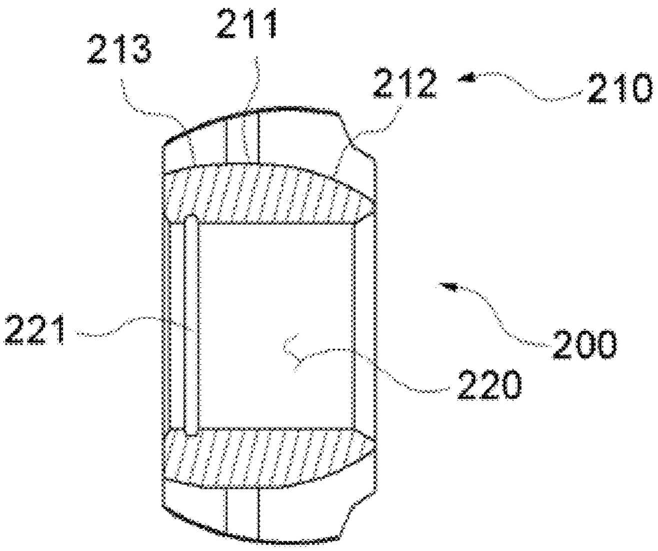
FIG. 3B is a side sectional view of the inner race in the first embodiment of the present disclosure.

As shown in FIGS. 3A and 3B, inner race tracks 210 may be formed on the outer circumferential surface of the inner race 200, all generally opening toward the outer direction of the cup portion 101.

The inner race track 210 may comprise an inner race linear track 211, an inner race outer curved track 212, and an inner race inner curved track 213.

The inner race linear track 211 may be formed with a linear shape in its side sectional view.

The inner race outer curved track 212 may be formed outside the inner race linear track 211 and may be formed as a curved surface inclined downward toward the outside.

The inner race inner curved track 213 may be formed inside the inner race linear track 211 and may be formed as a curved surface slightly inclined downward toward the inside of the cup portion 101.

The length of the inner race outer curved track 212 may preferably be formed longer than that of the inner race inner curved track 213.

A shaft insertion hole 220 may be provided at the center of the inner race 200, and a circlip groove 221 may be provided on the inner circumferential surface of the shaft insertion hole 220 for engaging a circlip that fixes the shaft 500 and the inner race 200.

When the joint is not angularly articulated, the inner race linear track 211 may preferably be configured as a horizontal linear track arranged in a horizontal direction.

Figure 4:
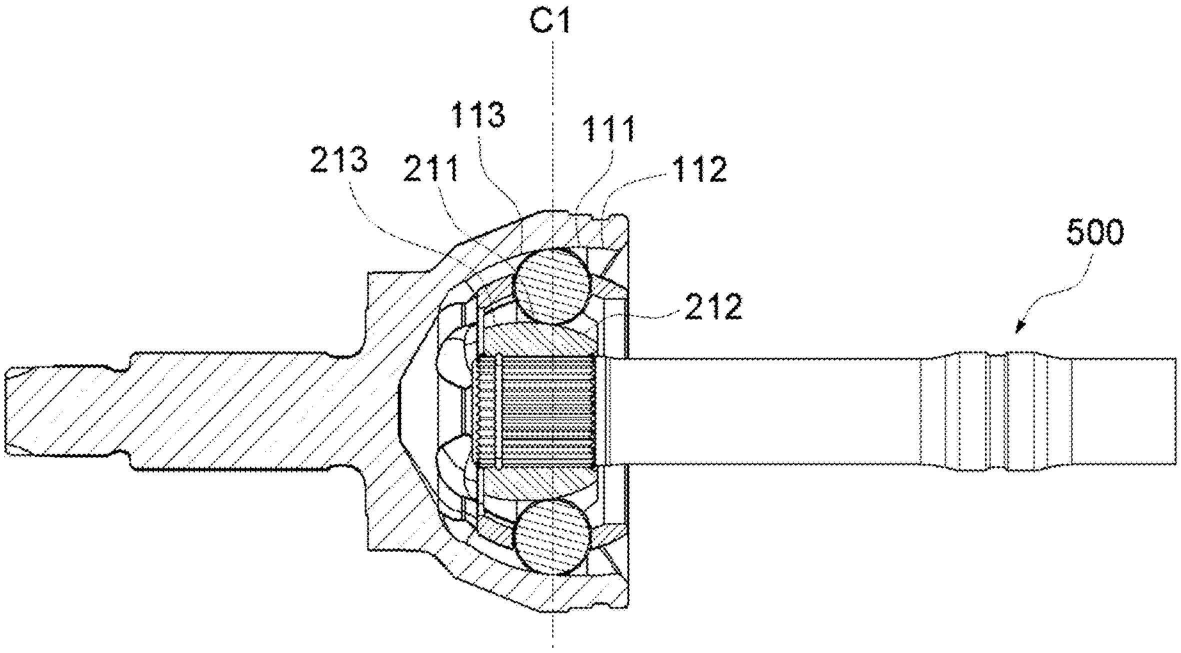
FIG. 4 is a side sectional view showing a state where the constant velocity joint according to the first embodiment of the present disclosure is not angularly articulated.
Figure 5:
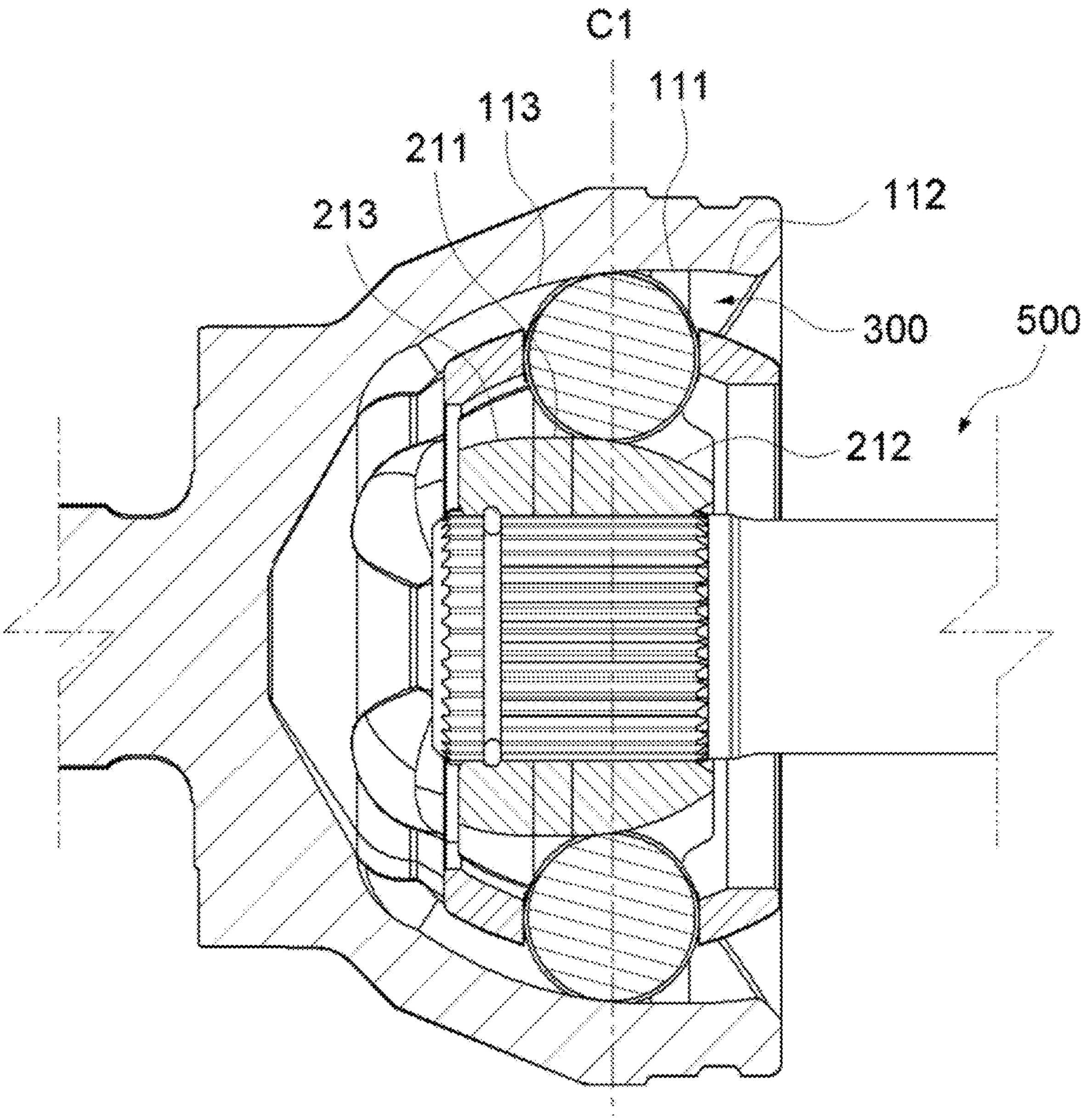
FIG. 5 is an enlarged side sectional view of FIG. 4.

As shown in FIGS. 4 and 5, in a state where no angular articulation occurs, when compared with the vertical center C1 of the joint, i.e., the vertical line of the rotational center of a virtual constant velocity plane (homokinetic plane) implemented by the center points of the balls, the outer race linear track 111 may be positioned outside the cup portion 101 relative to the vertical center C1 of the joint, and the inner race linear track 211 may be positioned inside the cup portion 101 relative to the vertical center C1 of the joint.

And, in a state where no angular articulation occurs, a virtual line formed by the vertical center C1 of the joint may be positioned at the outer race inner curved track 113 and the inner race outer curved track 212.

And, in a state where the joint is not angularly articulated, the outer race linear track 111 may be arranged to face the inner race outer curved track 212, and the inner race linear track 211 may be arranged to face the outer race inner curved track 113.

Figure 6:
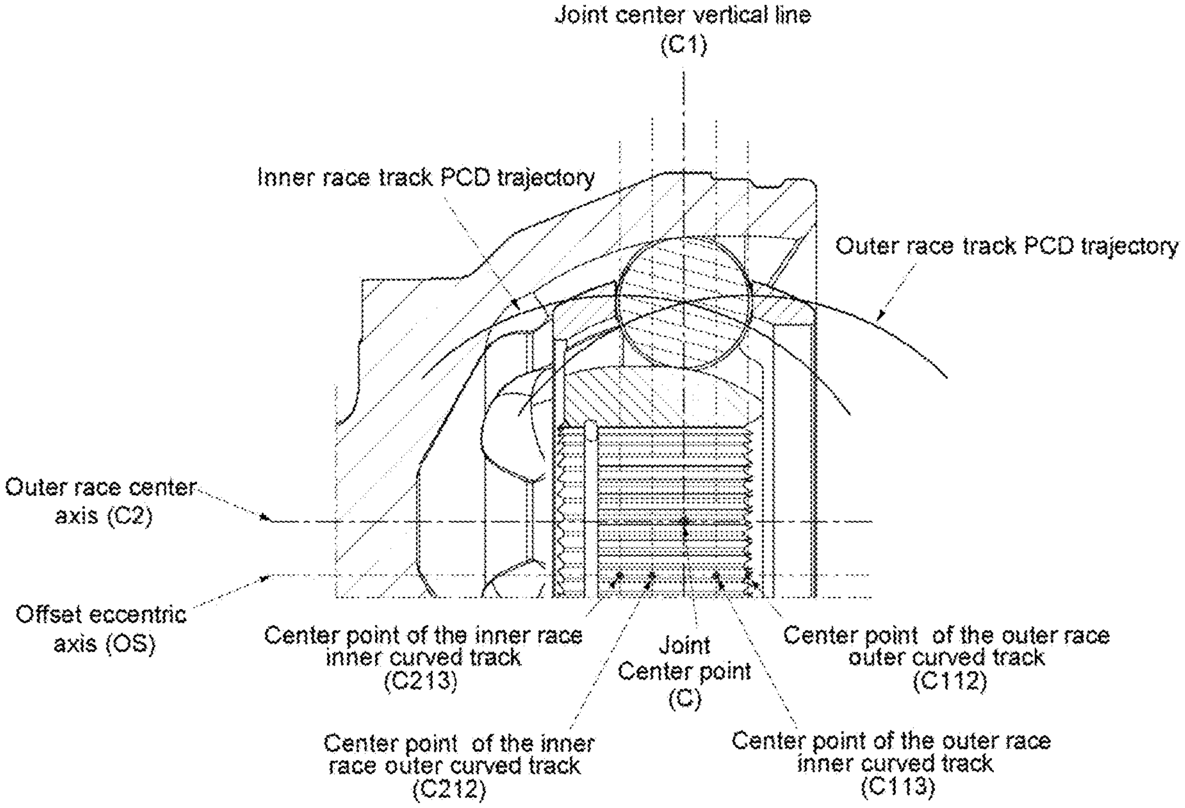
FIG. 6 is a side sectional view showing the shapes of the inner and outer races and the relative positions between each center point in the constant velocity joint according to the first embodiment of the present disclosure.

As shown in FIG. 6, the trajectory of the PCD (pitch circle diameter) of the inner race track and the trajectory of the PCD (pitch circle diameter) of the outer race track may be illustrated.

Figure 7:
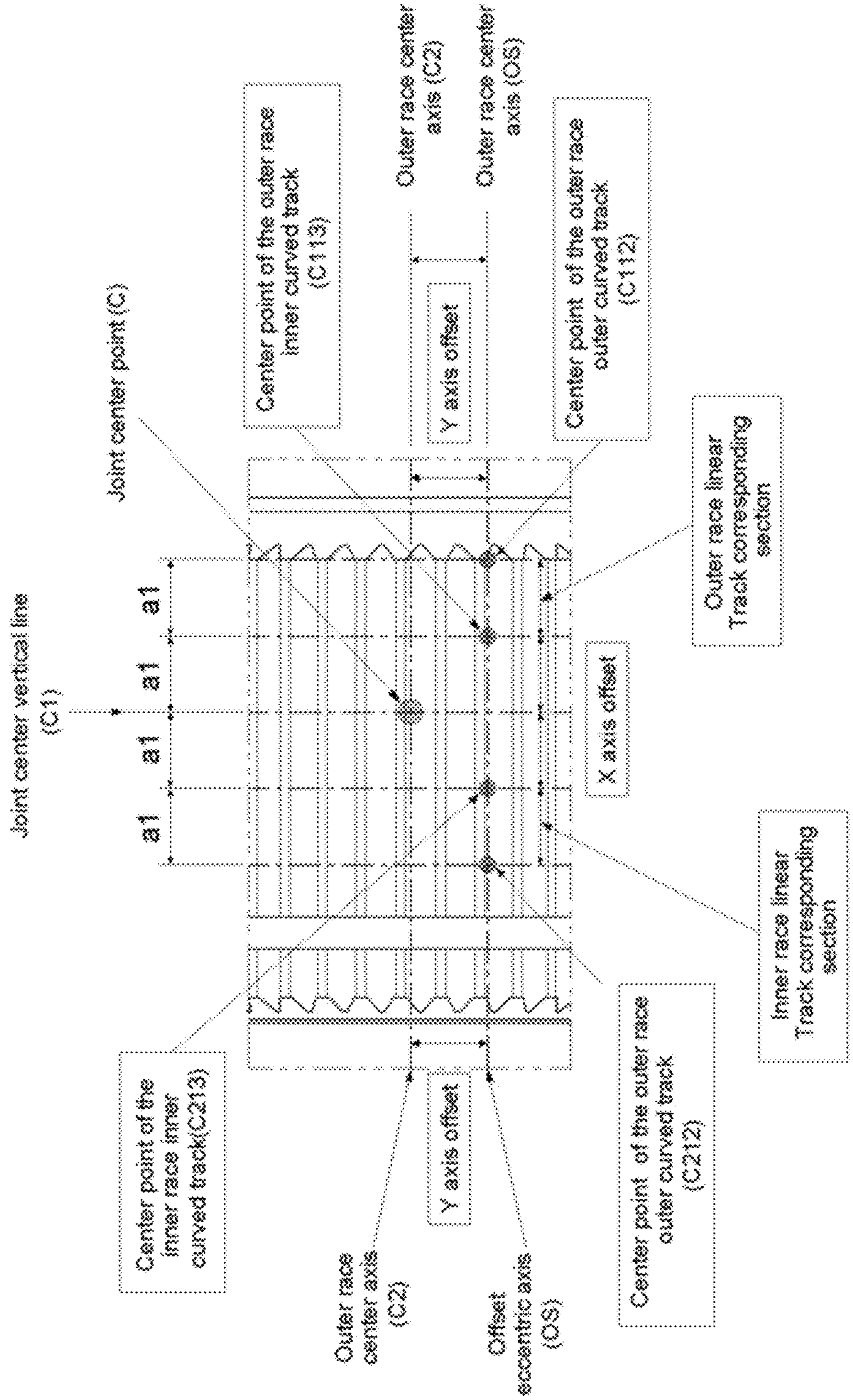
FIG. 7 is a detailed side sectional view showing the positions of each center point in the first embodiment of the present disclosure.

FIGS. 6 and 7 may show all of: the trajectory of the PCD of the inner race track; the trajectory of the PCD of the outer race track; the center point C212 of the inner race outer curved track; the center point C213 of the inner race inner curved track; the center point C113 of the outer race inner curved track; and the center point C112 of the outer race outer curved track.

As described above, the inner race outer curved track 212, the inner race inner curved track 213, the outer race outer curved track 112, and the outer race inner curved track 113 may all be formed in a curved surface (or curved cross-sectional) shape.

Here, the center point of each track may refer to the rotational center of the base material of the outer race and inner race when machining the curved surface track with a milling machine.

That is, the center point may also be considered as the rotational center point of the material for machining the curved surface of the track.

Figure 8:
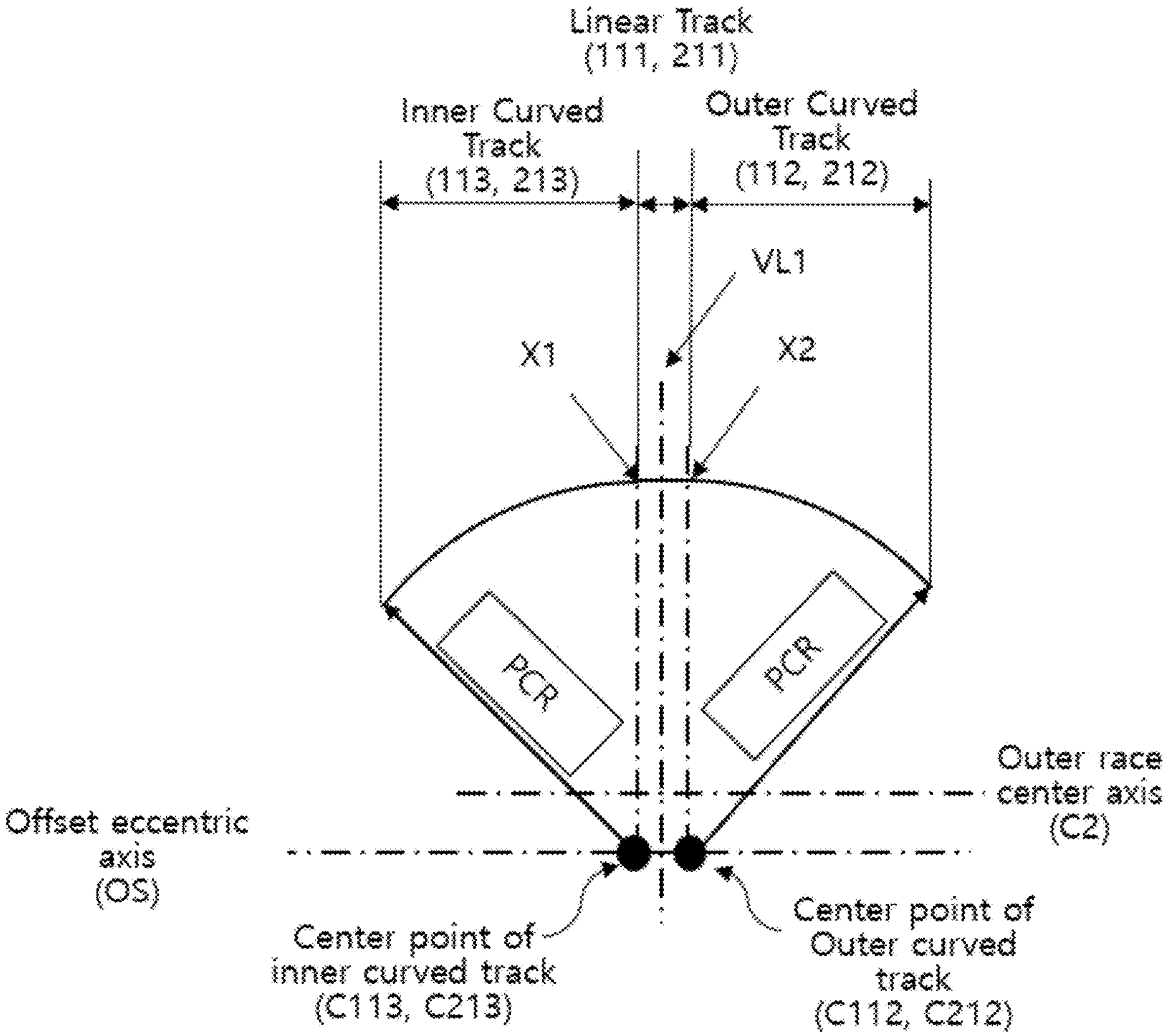
FIG. 8 is a schematic view of the inner curved track, linear track, outer curved track, and the center points of the inner curved track and outer curved track in the first embodiment of the present disclosure.

FIG. 8 may be a drawing that defines: the outer curved tracks 112, 212 and inner curved tracks 112, 212 commonly applied to both the inner race track 210 and outer race track 110; the linear tracks 111, 211 arranged between them; and the positions of the center points of the inner curved tracks C113, C213 and the center points of the outer curved tracks C112, C212.

The inner race track 210 and outer race track 110 may both comprise: outer curved tracks 112, 212; inner curved tracks 113, 213; and linear tracks 111, 211 arranged between them.

The center points C113, C213 of the inner curved tracks and the center points C112, C212 of the outer curved tracks may be arranged spaced apart from each other.

An offset eccentric axis OS may be formed spaced apart by a predetermined distance in the vertical axis direction, i.e., the y-axis direction, from the outer race central axis C2 on which the constant velocity joint center is positioned, and the center points C113, C213 of the inner curved tracks and the center points C112, C212 of the outer curved tracks may each be arranged on the offset eccentric axis OS.

The x-axis coordinate of the center points C113, C213 of the inner curved tracks may be identical to the x-axis coordinate of the intersection point X1 where the inner curved track meets the linear track, and the x-axis coordinate of the center points C112, C212 of the outer curved tracks may be identical to the x-axis coordinate of the intersection point X2 where the outer curved track meets the linear track.

The center points C113, C213 of the inner curved tracks and the center points C112, C212 of the outer curved tracks may be symmetrical in the x-axis direction while maintaining equal distances from a virtual vertical line VL1 that vertically passes through the center of the linear tracks 111, 211.

The center points C113, C213 of the inner curved tracks and the center points C112, C212 of the outer curved tracks may each be spaced apart by a distance of half of a1 (a½) from the virtual vertical line VL1, and may be symmetrical in the x-axis direction with respect to the virtual vertical line VL1.

As shown in FIGS. 6 and 7, the center point C112 of the outer race outer curved track, the center point C113 of the outer race inner curved track, the center point C212 of the inner race outer curved track, and the center point C213 of the inner race inner curved track may be arranged on an offset eccentric axis OS spaced apart from the central axis C2 of the outer race by a first distance a1 in the vertical direction.

The X-axis section between the center point C112 of the outer race outer curved track and the center point C113 of the outer race inner curved track may correspond to the arrangement section of the outer race linear track 111, and the X-axis section between the center point C212 of the inner race outer curved track and the center point C213 of the inner race inner curved track may correspond to the arrangement section of the inner race linear track 211.

Meanwhile, the joint center point C may be positioned on the central axis C2 of the outer race, wherein, as described above, the joint center point C may be defined as the center point of a virtual constant velocity plane (homokinetic plane) formed by the center points of the balls.

The center point C113 of the outer race inner curved track may be horizontally offset outwardly by the first distance a1 with respect to the joint center point C.

The center point C113 of the outer race inner curved track may be vertically offset by the first distance a1 in the opposite direction of the corresponding outer race track 110.

The center point C112 of the outer race outer curved track may be horizontally offset outwardly by the first distance a1 on the offset eccentric axis OS with respect to the center point C113 of the outer race inner curved track.

With the joint center point C located on the outer race center axis C2, the center point C212 of the inner race outer curved track may be horizontally offset inwardly by a first distance a1 with respect to the joint center point C.

The center point C212 of the inner race outer curved track may be vertically offset by the first distance a1 in the opposite direction of the inner race track with respect to the joint center point C.

The center point C213 of the inner race inner curved track may be horizontally offset inwardly by the first distance a1 on the offset eccentric axis OS with respect to the center point C212 of the inner race outer curved track.

Therefore, in summary, with reference to a joint center vertical line C1 passing vertically through the joint center point C, the center point C113 of the inner curved track of the outer race is offset outwardly by a first distance a1 along the offset eccentric axis OS line.

The center point C212 of the outer curved track of the inner race may be offset inwardly by a first distance a1 along the offset eccentric axis OS line.

The center point C113 of the outer race inner curved track and the center point C212 of the inner race outer curved track may form a horizontally symmetrical arrangement spaced apart by the first distance a1 with the constant velocity joint center vertical line C1 positioned between them.

Furthermore, with reference to a joint center vertical line C1 passing vertically through the joint center point C, the center point C112 of the outer race outer curved track may be spaced apart outwardly by twice the first distance a1 along the offset eccentric axis OS line.

The center point C213 of the inner race inner curved track may be spaced apart inwardly by twice the first distance a1 along the offset eccentric axis OS line.

Therefore, the center point C112 of the outer race outer curved track and the center point C213 of the inner race inner curved track may form a horizontally symmetrical arrangement spaced apart by twice the first distance a1 with the constant velocity joint center vertical line C1 positioned between them.

That is, with reference to the joint center vertical line C1, the center point C113 of the outer race inner curved track may be positioned at a location spaced apart outwardly by the first distance a1 along the offset eccentric axis OS, and the center point C112 of the outer race outer curved track may be positioned at a location spaced apart further outwardly by the first distance a1 from the center point C113 of the outer race inner curved track.

Also, with reference to the joint center vertical line C1, the center point C212 of the inner race outer curved track may be positioned at a location spaced apart inwardly by the first distance a1 along the offset eccentric axis OS, and the center point C213 of the inner race inner curved track may be positioned at a location spaced apart further inwardly by the first distance a1 from the center point C212 of the inner race outer curved track.

And, the outer race center axis C2 and the offset eccentric axis OS may be spaced apart by the first distance a1.

Therefore, the center point C112 of the outer race outer curved track, the center point C113 of the outer race inner curved track, the center point C212 of the inner race outer curved track, and the center point C213 of the inner race inner curved track may all maintain an offset state along the y-axis by the first distance a1 in the opposite direction of their respective inner and outer race tracks relative to the outer race center axis C2.

Figure 9:
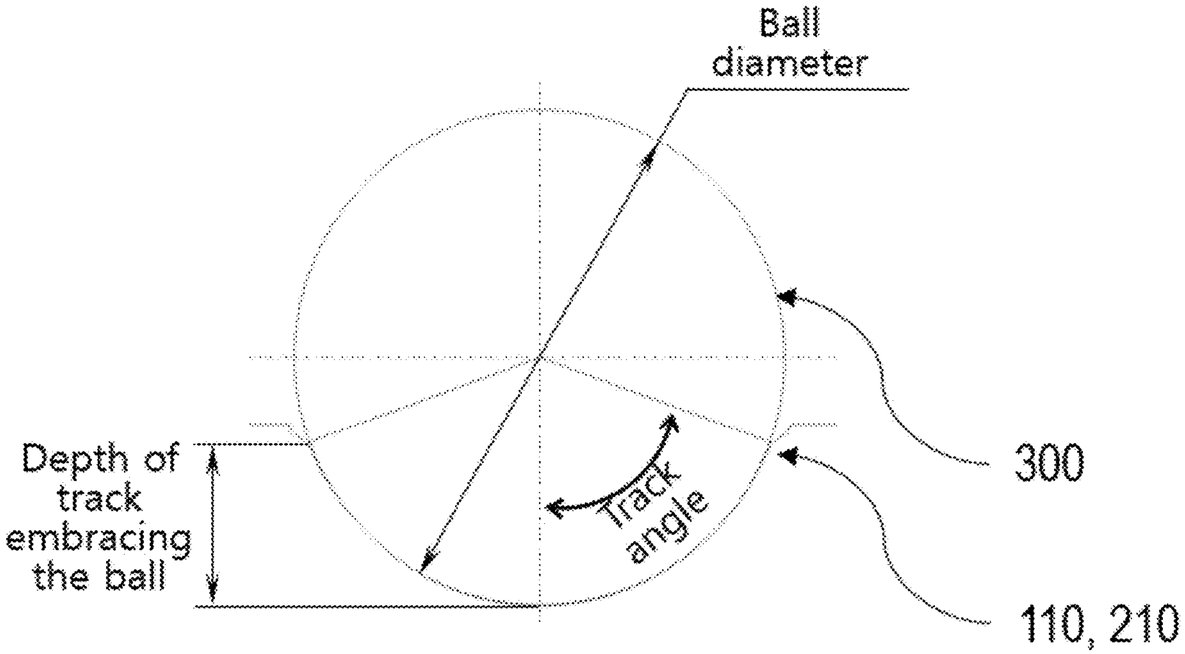
FIG. 9 is a schematic view showing the arrangement state between the balls and tracks.

As shown in FIG. 9, when the ball 300 is positioned in the tracks 110, 210, the depth of the track embracing the ball 300 may be defined as the depth from the lowest point of the track bottom 110, 210 to the highest point of the track 110, 210 in contact with the ball. And the track angle may be defined as the angle from the lowest point of the track bottom 110, 210 to the highest point of the track 110, 210 in contact with the ball.

Here, as the depth of the track embracing the ball 300 increases, the ball supporting capability increases, and consequently, the degree of deformation of the inner race track or outer race track decreases.

Figure 10:
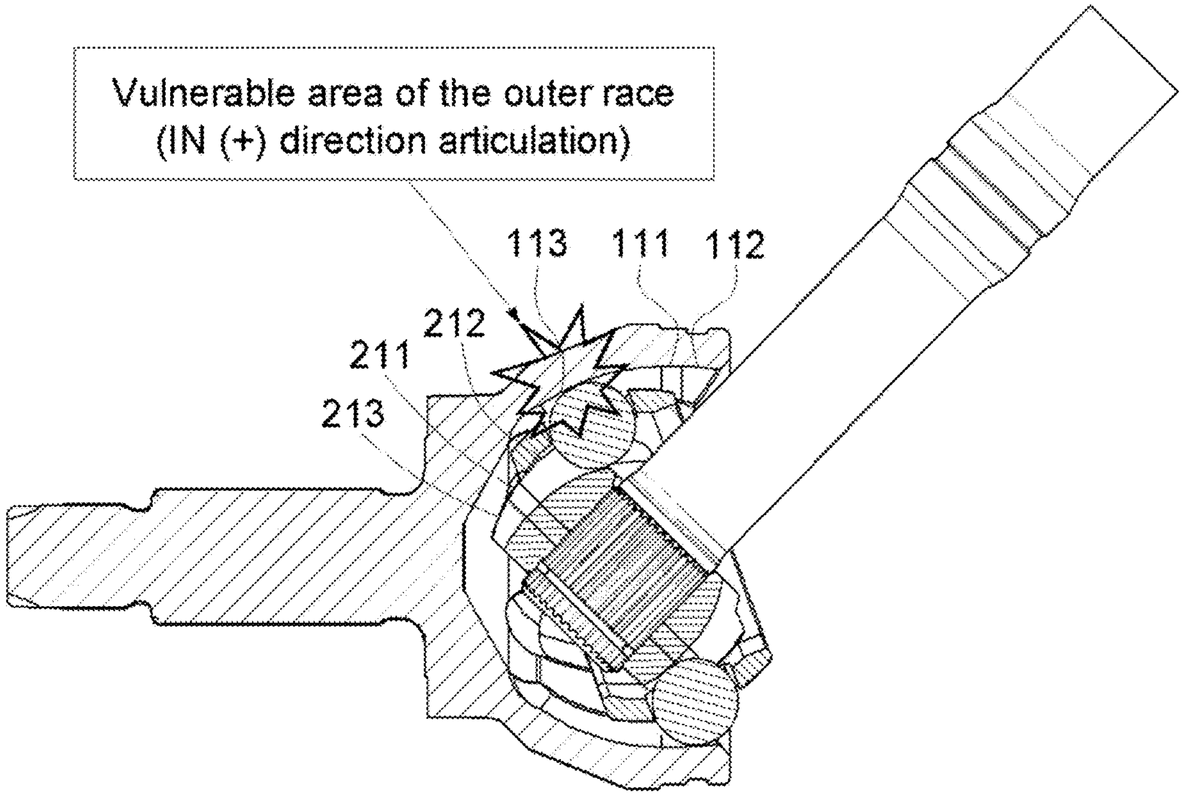
FIG. 10 is a side sectional view showing a maximum angular articulation state in the IN direction (+) in the first embodiment of the present disclosure.
Figure 11:
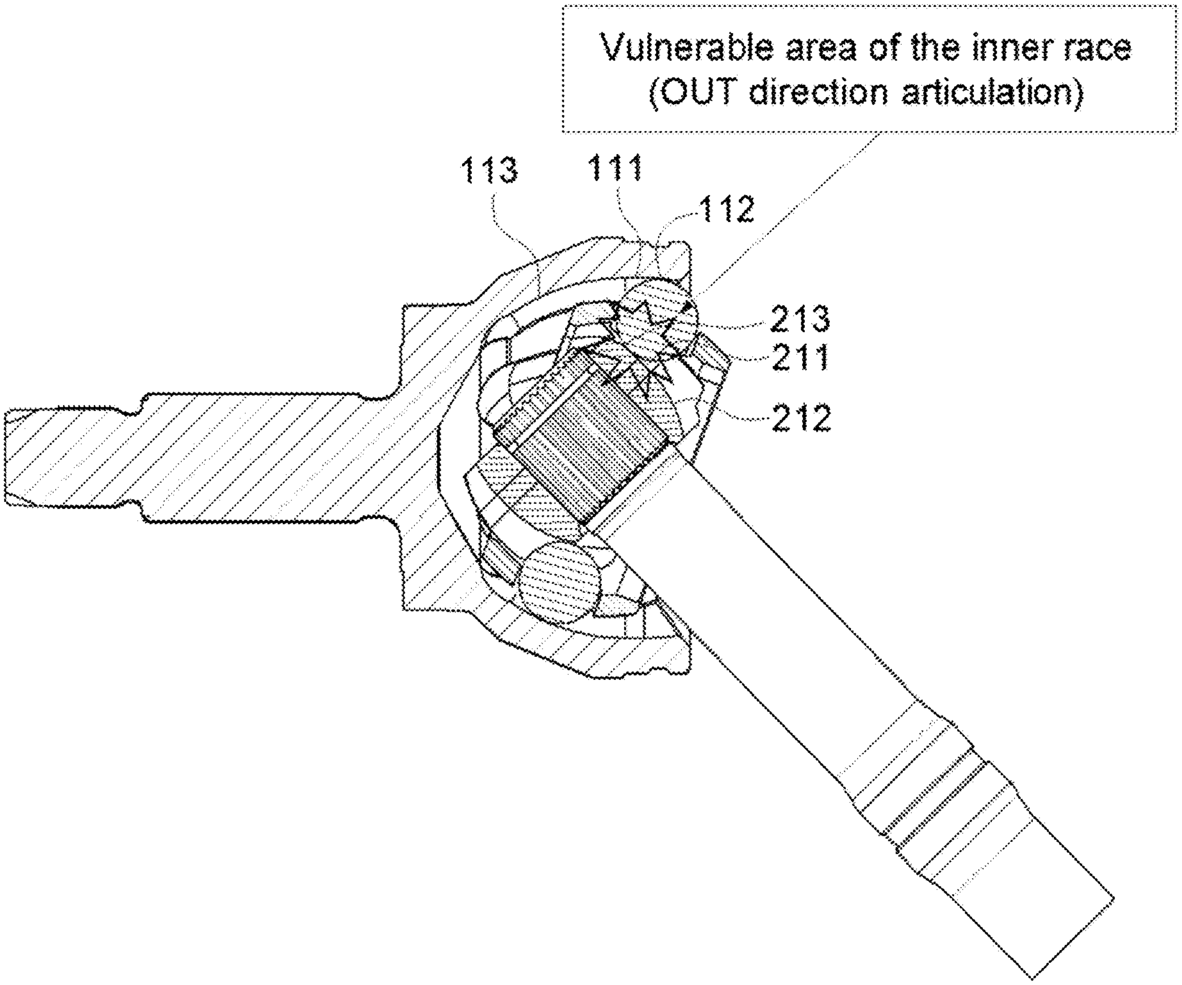
FIG. 11 is a side sectional view showing a maximum angular articulation state in the OUT direction (−) in the first embodiment of the present disclosure.
Figure 12:
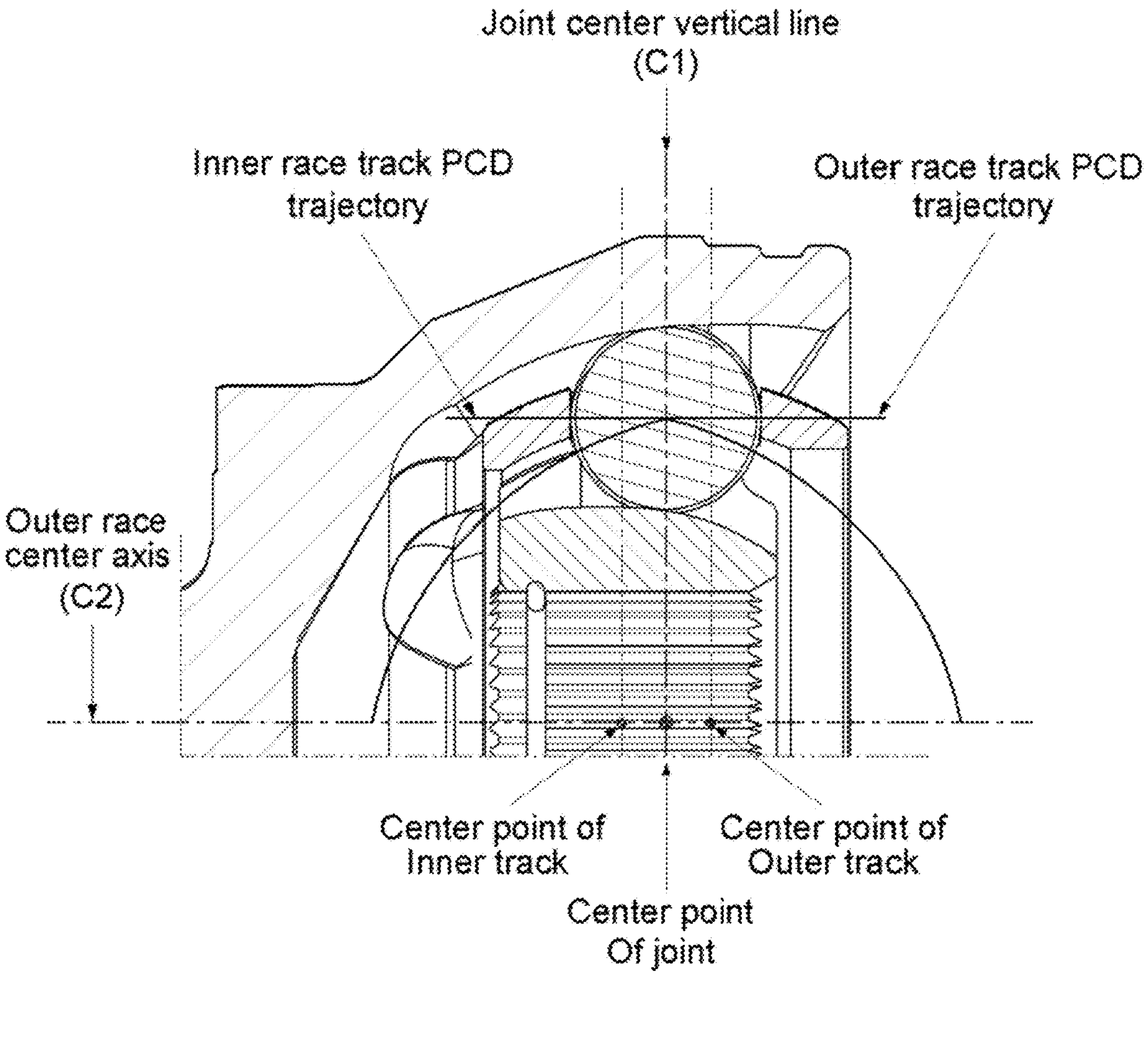
FIG. 12 is a side sectional view showing the state of the inner race track and outer race track in the conventional art.
Figure 13:
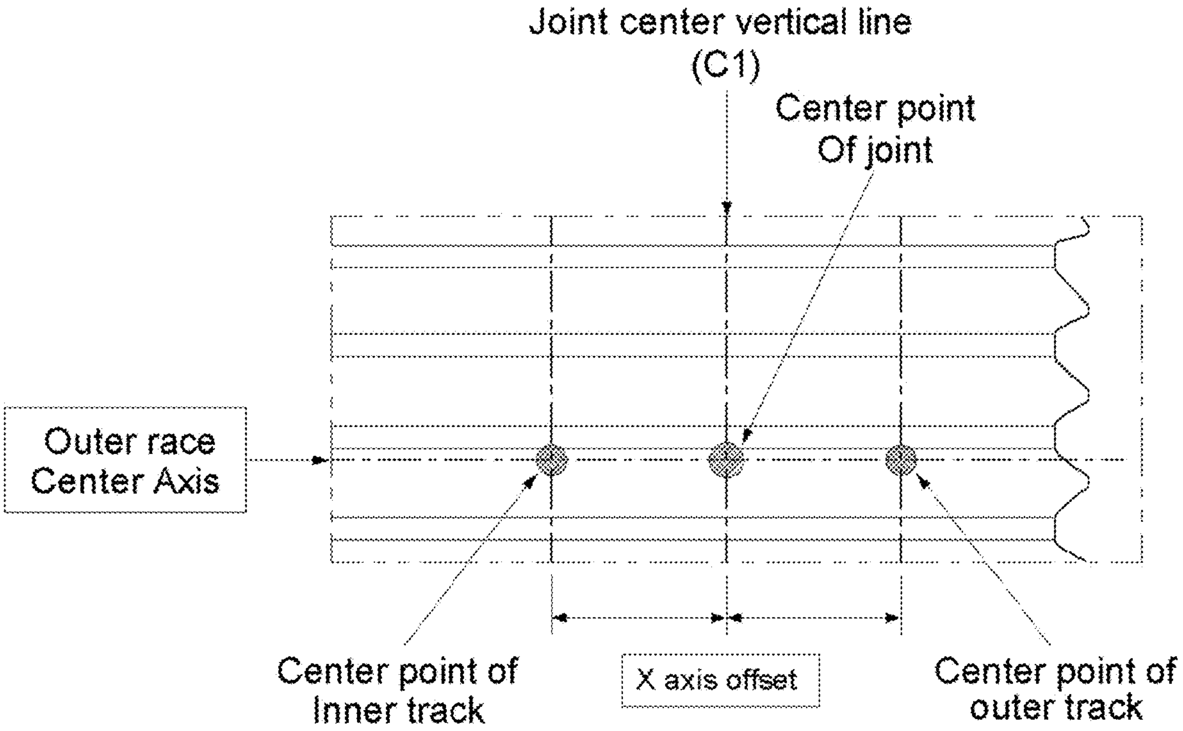
FIG. 13 is a detailed side sectional view showing the relative positions and offset of the inner race track center point and outer race track with respect to the constant velocity joint center point in the conventional art.
Figure 14:
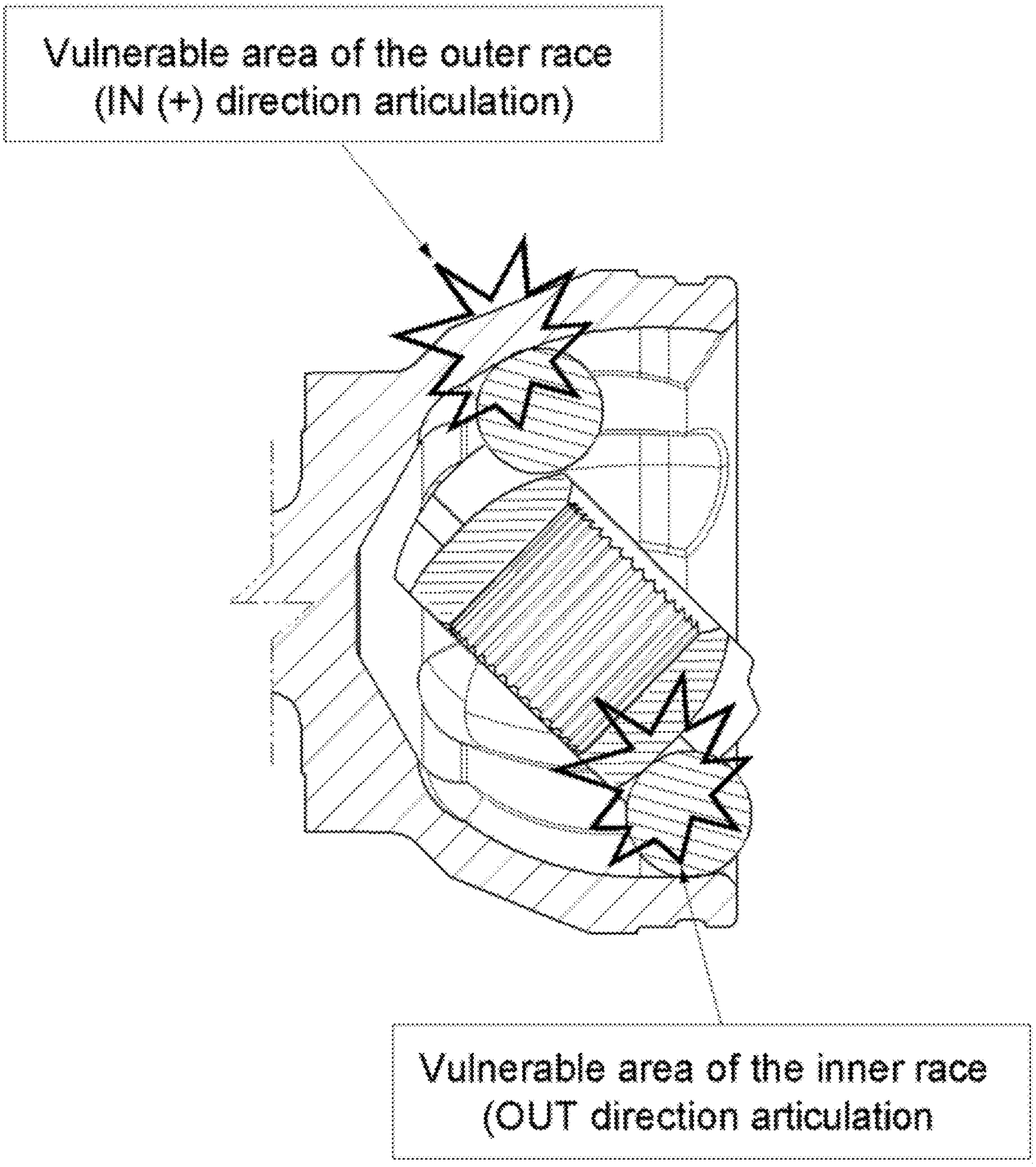
FIG. 14 is a schematic view indicating vulnerable areas during joint angular articulation in the conventional art.

FIG. 10 illustrates the joint according to the present disclosure articulated at +47 degrees, and FIG. 11 illustrates it articulated at −47 degrees. When articulating in the IN(+) direction, the outer race inner track receives more influence from ball pressure, and when articulating in the OUT(−) direction, the inner race inner track receives more influence from ball pressure.

Therefore, when articulating in the IN(+) direction, performance evaluation of the relationship between the outer race inner track and the ball becomes important, and when articulating in the OUT(−) direction, performance evaluation of the relationship between the inner race inner track and the ball becomes important.

Figure 15:
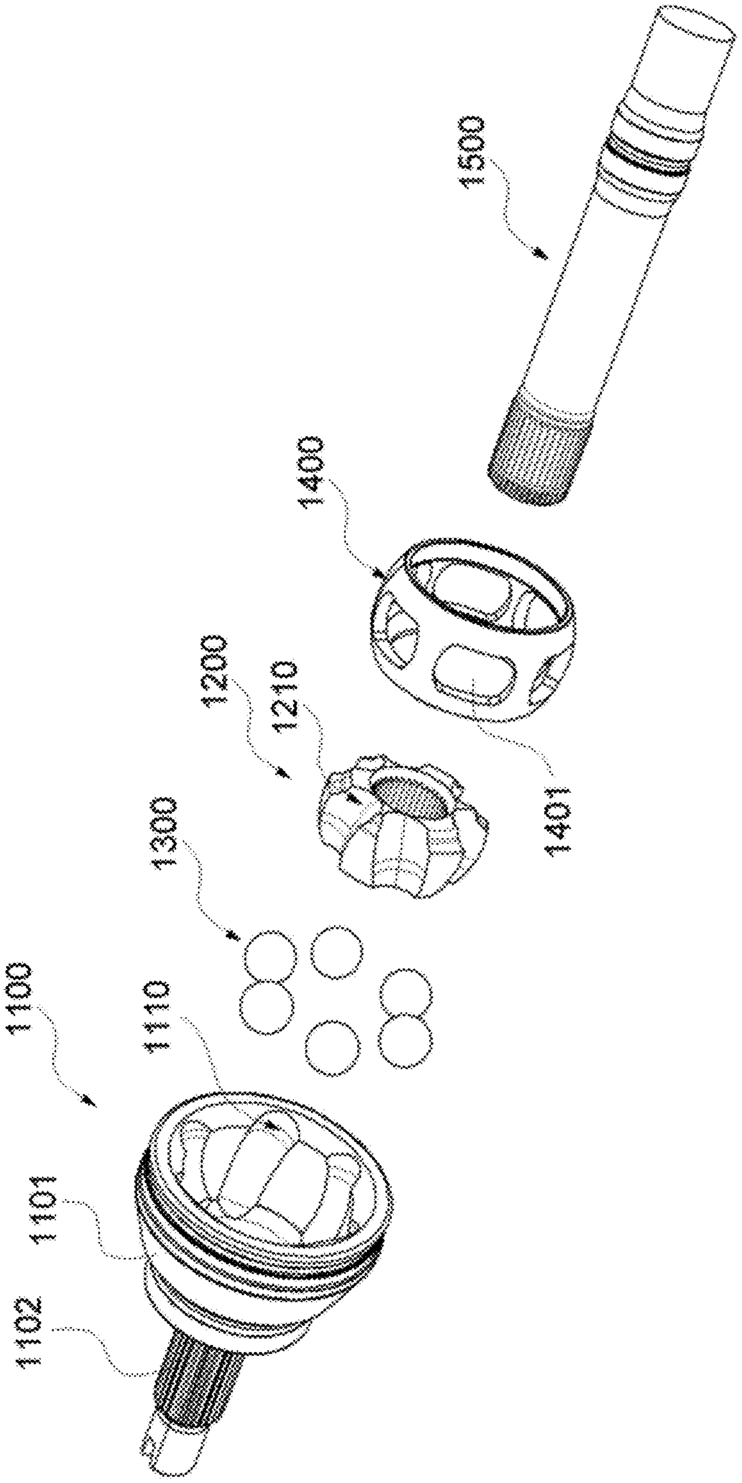
FIG. 15 is an exploded perspective view of a second embodiment of the present disclosure.

As shown in FIG. 15, the constant velocity joint with skew angle according to the second embodiment of the present disclosure (hereinafter referred to as 'constant velocity joint') may include an outer race 1100 having a cup portion 1101 and connected to a shaft 1102 that may transmit rotational force to a vehicle wheel, an inner race 1200 that may be provided inside the outer race, a plurality of balls 1300 that may be provided between the outer race and the inner race 1200, and a cage 1400 that may support the balls 1300 to help maintain the balls 1300 in a constant velocity plane (homokinetic plane).

While FIG. 15 illustrates six balls 1300, the quantity may not be limited thereto.

A number of outer race tracks 1110 corresponding to the number of balls may be provided on the inner surface of the cup portion 1101.

And, inner race tracks 1210 that may correspond to the number of balls and may face each outer race track 1110 may be provided on the outer circumferential surface of the inner race 1200.

Windows 1401 into which each ball 1300 may be inserted may be provided in the cage 1400, and when the joint is articulated, the constant velocity plane (homokinetic plane) of the balls 1300 may be maintained by the cage 1400.

Figure 16:
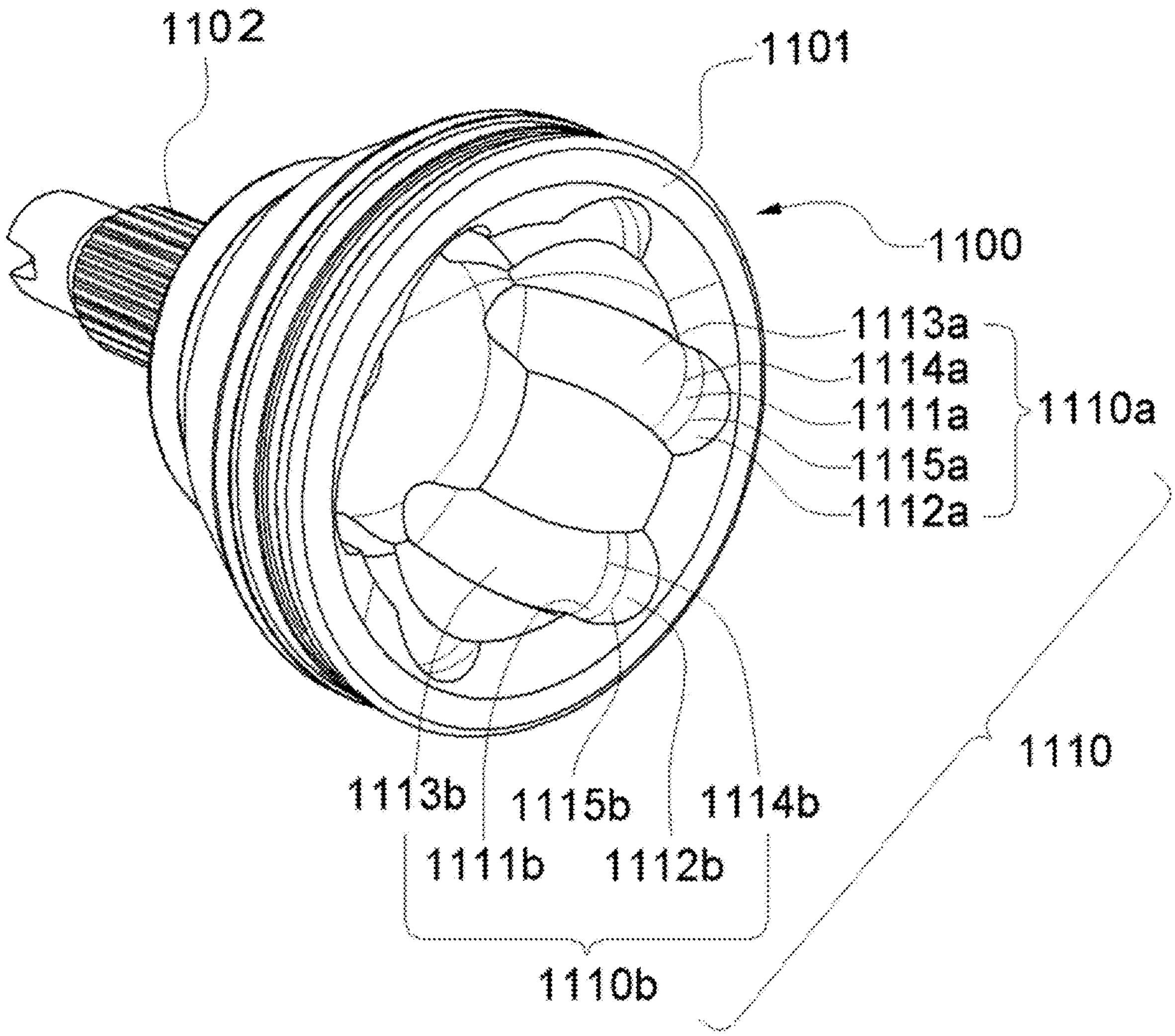
FIG. 16 is an internal structural view of the outer race in the second embodiment of the present disclosure.
Figure 17:
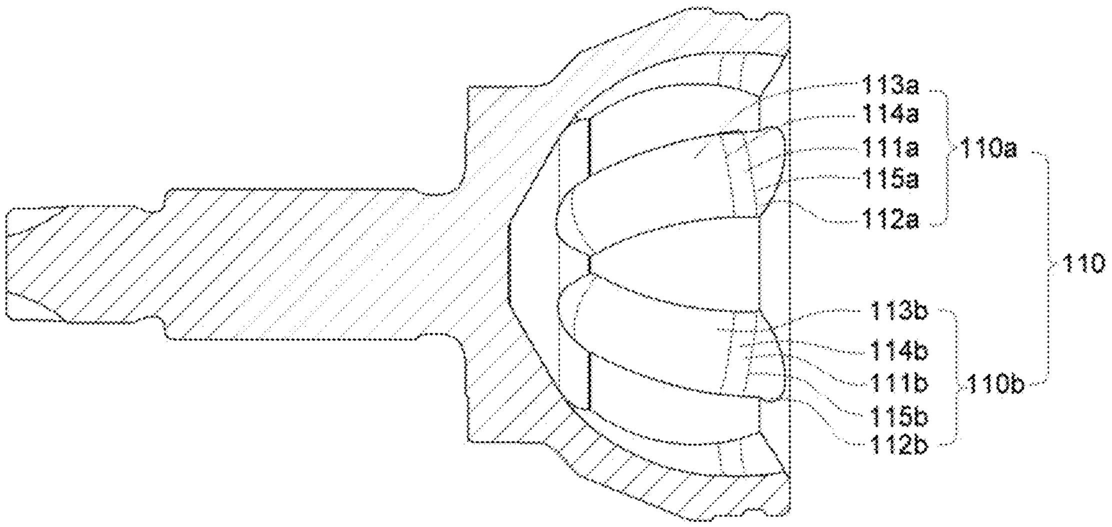
FIG. 17 is a side sectional view of the outer race in the second embodiment of the present disclosure.

FIGS. 16 and 17 illustrate the internal structure of the outer race 1100.

The outer race tracks 1110 on the inner circumferential surface of the outer race 1100 may be all opened toward the outside direction of the cup portion 1101. The outer race tracks 1110 may be provided to have a certain oblique angle (skew angle) with respect to the horizontal center line of the joint, and adjacent outer race tracks 1110 may have skew angles in different directions.

Here, since the outer race tracks may appear in two forms, for convenience, they may be classified as first outer race track 1110*a* and second outer race track 1110*b*.

The outer race tracks 1110; 1110*a*, 1110*b* may include outer race linear tracks 1111; 1111*a*, 1111*b* having a linear cross-sectional shape, outer race outer curved tracks 1112; 1112*a*, 1112*b* that may be formed on the outside of the outer race linear tracks 1111; 1111*a*, 1111*b* and may be formed in a curved surface shape slightly inclined downward toward the outside, and outer race inner curved tracks 1113; 1113*a*, 1113*b* that may be formed on the inside of the outer race linear tracks 1111; 1111*a*, 1111*b* and may be formed in a curved surface shape inclined downward toward the inside of the cup portion 1101.

It is preferable that the length of the outer race inner curved tracks 1113; 1113*a*, 1113*b* is formed longer compared to the outer race outer curved tracks 1112; 1112*a*, 1112*b*.

It is preferable that the outer race linear tracks 1111; 1111*a*, 1111*b* consist of horizontal linear tracks arranged in the horizontal direction when the constant velocity joint is not articulated.

Meanwhile, outer race linear track inner boundary lines 1114; 1114*a*, 1114*b* are provided between the outer race linear tracks 1111; 1111*a*, 1111*b* and the outer race inner curved tracks 1113; 1113*a*, 1113*b*.

And, outer race linear track outer boundary lines 1115; 1115*a*, 1115*b* are provided between the outer race linear tracks 1111; 1111*a*, 1111*b* and the outer race outer curved tracks 1112; 1112*a*, 1112*b*.

Therefore, the outer race linear tracks 1111; 1111*a*, 1111*b* may be provided between the outer race linear track inner boundary lines 1114; 1114*a*, 1114*b* and the outer race linear track outer boundary lines 1115; 1115*a*, 1115*b*.

Figure 21A:
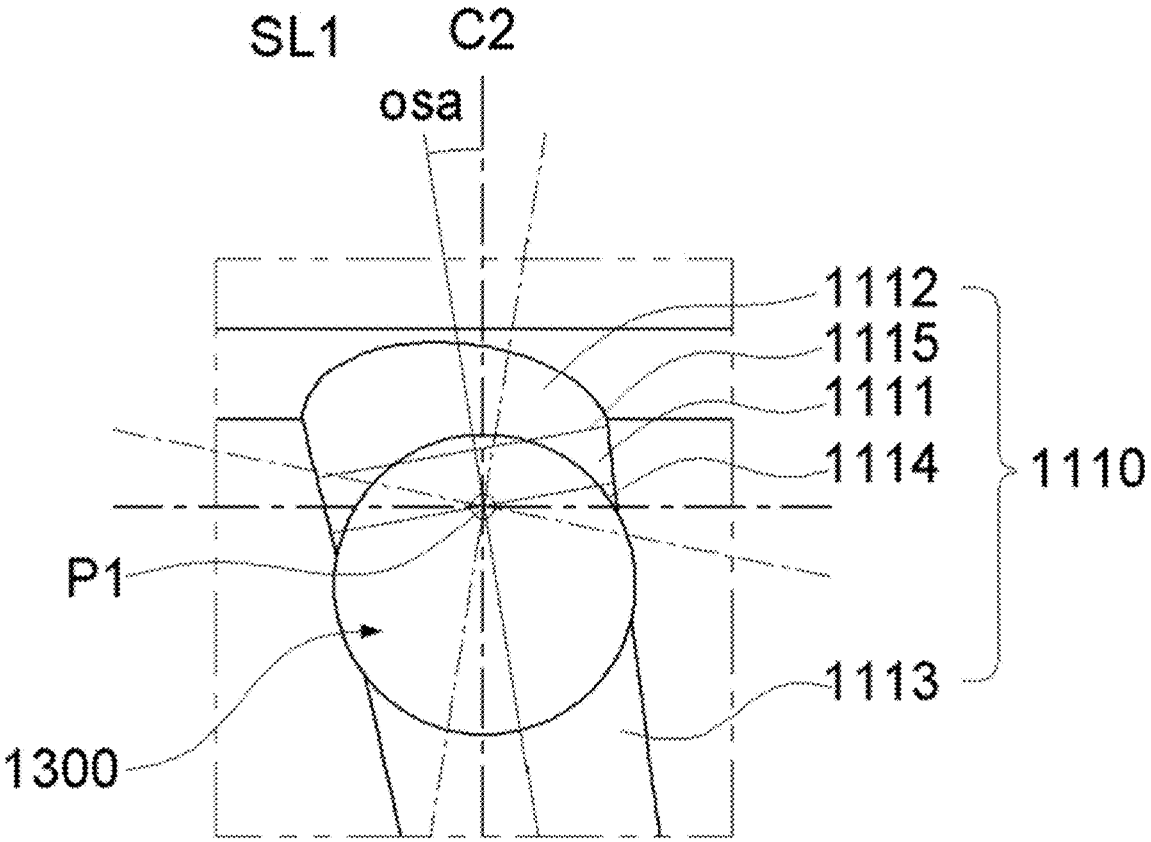
FIG. 21A shows the shape of the outer race track according to the outer race track skew angle in the second embodiment of the present disclosure.
Figure 21B:
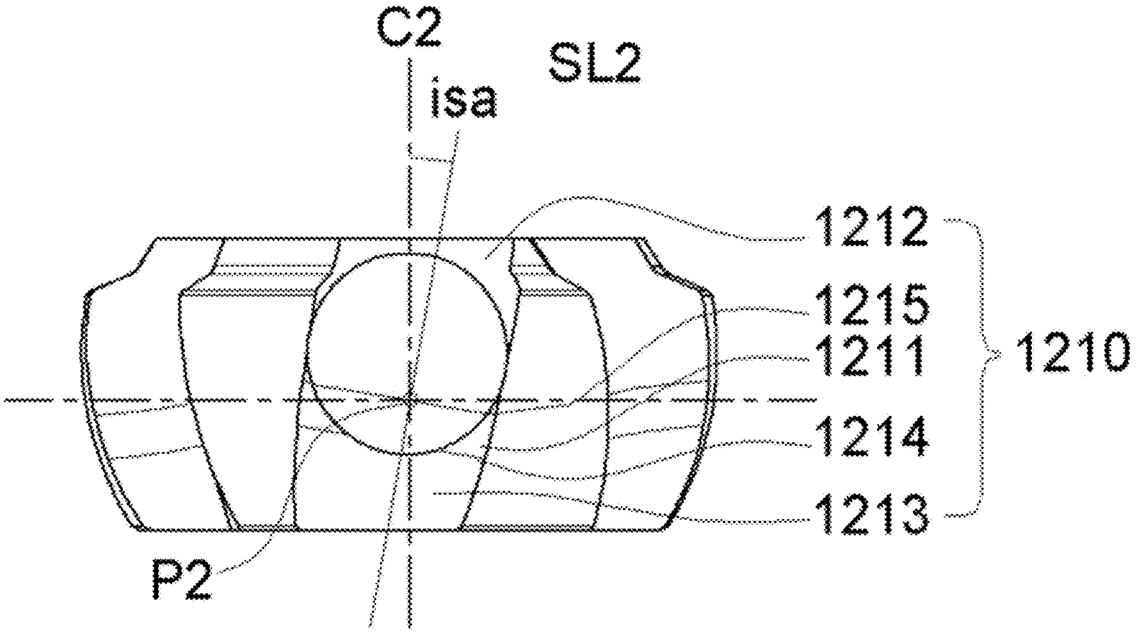
FIG. 21B shows the shape of the inner race track according to the inner race track skew angle in the second embodiment of the present disclosure.

As will be explained in detail later, the skew angle of the outer race track (see FIG. 21A, osa) is formed based on or started from the outer race linear track inner boundary lines 1114; 1114*a*, 1114*b*, and the skew angle of the inner race track (see FIG. 21B, isa) is formed based on or started from the inner race linear track outer boundary lines 1215; 1215*a*, 1215*b*.

Figure 18:
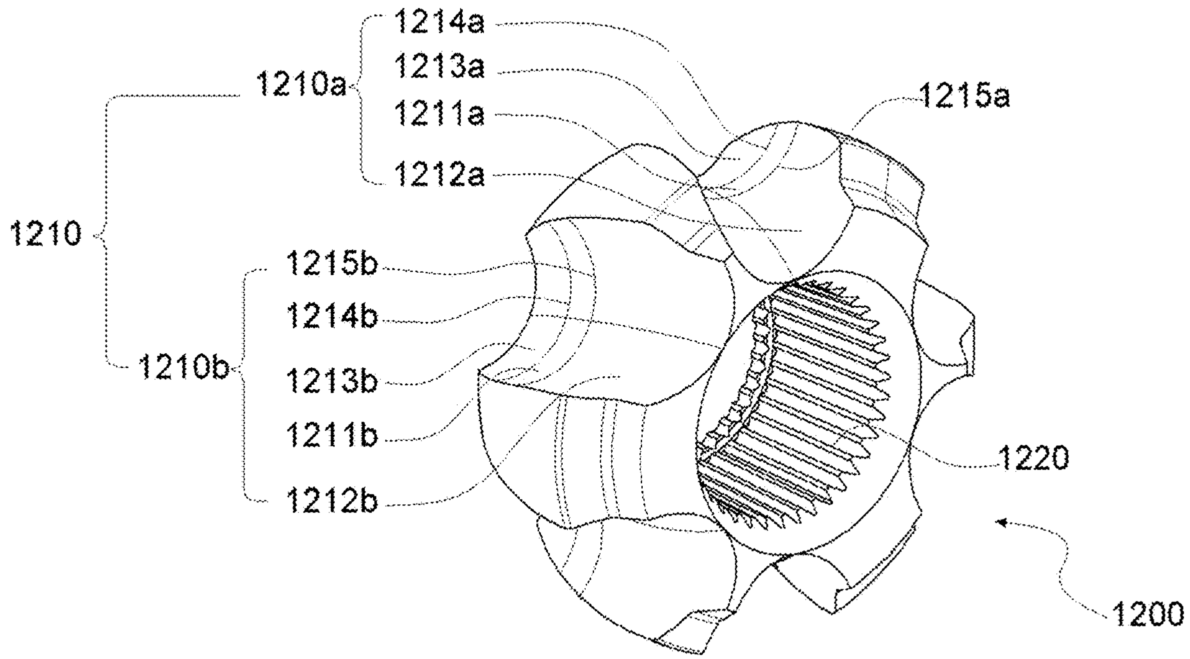
FIG. 18 is an external structural view of the inner race in the second embodiment of the present disclosure.
Figure 19:
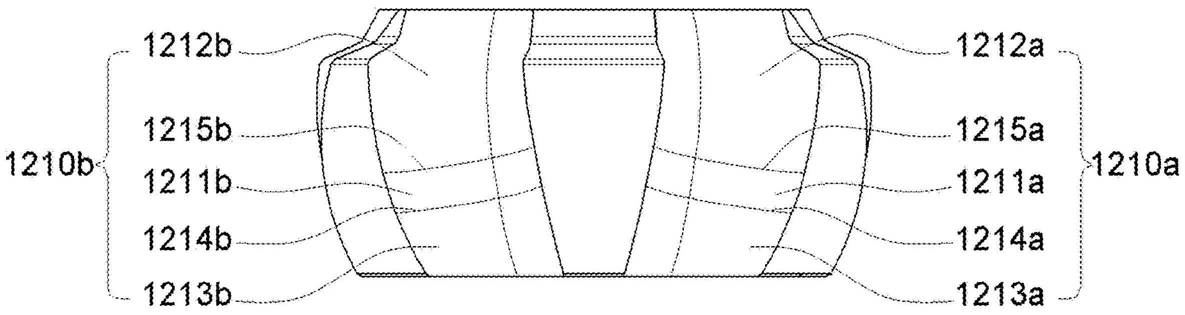
FIG. 19 is a side view of the inner race in the second embodiment of the present disclosure.
Figure 20:
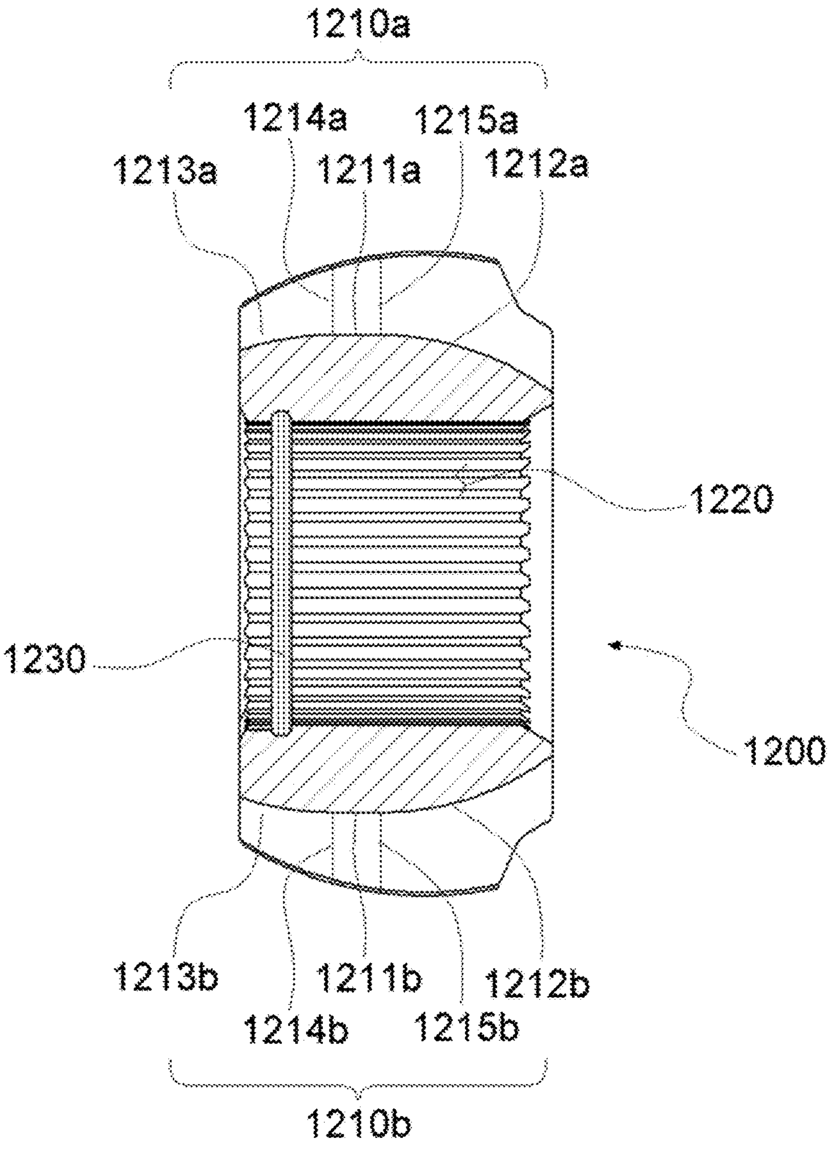
FIG. 20 is a side sectional view of the inner race in the second embodiment of the present disclosure.

FIGS. 18 to 19 show the outer surface structure of the inner race 1200, and FIG. 20 shows a cross-sectional view of the inner race 1200.

The inner race tracks 1210 on the outer circumferential surface of the inner race 1200 are all opened to face outward toward the cup portion 1101. The inner race tracks 1210 are provided to have a certain oblique angle (skew angle) with respect to the rotational center line C2 of the constant velocity joint, and adjacent inner race tracks 1210 have skew angles in different directions.

The inner race track 1210 may include an inner race linear track 1211 having a linear cross-sectional shape, an inner race outer curved track 1212 formed outside the inner race linear track 1211 and formed in a curved surface shape that slopes downward toward the outside, and an inner race inner curved track 1213 formed inside the inner race linear track 1211 and formed in a curved surface shape that slightly slopes downward toward the inside of the cup portion 1101.

It is preferable that the length of the inner race outer curved track 1212 is formed longer than that of the inner race inner curved track 1213.

Here, since the inner race track 1210 appears in two forms, it is distinguished as first inner race track 1210*a* and second inner race track 1210*b* for convenience.

The inner race track 1210; 1210*a*, 1210*b* may include an inner race linear track 1211; 1211*a*, 1211*b* having a linear cross-sectional shape, an inner race outer curved track 1212;

1212*a*, 1212*b* formed outside the inner race linear track 1211; 1211*a*, 1211*b* and formed in a curved surface shape that slightly slopes downward toward the outside, and an inner race inner curved track 1213; 1213*a*, 1213*b* formed inside the inner race linear track 1211; 1211*a*, 1211*b*.

It is preferable that the length of the inner race outer curved track 1212; 1212*a*, 1212*b* is formed longer than that of the inner race inner curved track 1213; 1213*a*, 1213*b*.

When the constant velocity joint is not articulated, it is preferable that the inner race linear track 1211; 1211*a*, 1211*b* is configured as a horizontal linear track arranged in a horizontal direction.

Meanwhile, an inner race linear track inner boundary line 1214; 1214*a*, 1214*b* may be provided between the inner race linear track 1211; 1211*a*, 1211*b* and the inner race inner curved track 1213; 1213*a*, 1213*b*.

And, an inner race linear track outer boundary line 1215; 1215*a*, 1215*b* may be provided between the inner race linear track 1211; 1211*a*, 1211*b* and the inner race outer curved track 1212; 1212*a*, 1212*b*.

Thus, the inner race linear track 1211; 1211*a*, 1211*b* may be provided between the inner race linear track inner boundary line 1214; 1214*a*, 1214*b* and the inner race linear track outer boundary line 1215; 1215*a*, 1215*b*.

As will be explained in detail later, the skew angle of the inner race track may be formed based on or started from the inner race linear track outer boundary line 1215; 1215*a*, 1215*b*, specifically at the center point of the inner race linear track outer boundary line 1215; 1215*a*, 1215*b*.

A shaft insertion hole 1220 may be provided at the center of the inner race 1200, and a circlip groove 1230 (see FIG. 20), into which a circlip for fixing the shaft 1500 and the inner race 1200 is fitted, may be provided on the inner circumferential surface of the shaft insertion hole 1220.

When the constant velocity joint is not articulated, the inner race linear track 1211; 1211*a*, 1211*b* may preferably be configured as a horizontal linear track arranged in a horizontal direction.

FIG. 21A illustrates a state where the outer race track 1110 is arranged along the outer race track skew angle (osa), and FIG. 21B illustrates a state where the inner race track 210 is arranged along the inner race track skew angle (isa).

As shown in FIGS. 20, 21A, 21B and 22, the inner race track 1210 may include a first inner race track 1210*a* and a second inner race track 1210*b*. The outer race track 1110 may include a first outer race track 1110*a* and a second outer race track 1110*b*. The first outer race track 1110*a* corresponds to and faces the first inner race track 1210*a* with the ball 1200 and the cage 1400 therebetween. The second outer race track 1110*b* corresponds to and faces the second inner race track 1210*b* with the ball 1200 and the cage 1400 therebetween.

The first inner race track 1210*a* may be obliquely arranged in a first direction with respect to the center axis line C2 of the joint to form an inner race track skew angle (isa). The first outer race track 1110*a* facing the first inner race track 1210*a* is obliquely arranged in a second direction, which is symmetrical to the first direction with respect to the center axis line C2, to form an outer race track skew angle (osa).

The second inner race track 1210*b* arranged next to the first inner race track 1210*a* may be obliquely arranged in the second direction with respect to the center axis line C2 of the joint to form an inner race track skew angle (isa). The second outer race track 1110*b* facing the second inner race track 1210*b* may be obliquely arranged in the first direction, which is symmetrical to the second direction with respect to the center axis line C2, to form an outer race track skew angle (osa).

Although the present disclosure has been described above with reference to embodiments thereof, those of skill in the art will appreciate that various modifications and changes may be made to the present disclosure without departing from the spirit and scope of the disclosure as set forth in the claims below. Therefore, if a modified implementation basically includes components of the claims of the present disclosure, it should be considered to be included in the scope of the present disclosure.

And, a width direction of the inner race linear track 1211; 1211*a*, 1211*b* may be formed in a direction perpendicular to an imaginary extension line SL2 that is formed along the inner race track skew angle (isa).

That is, an inner boundary line 1214; 1214*a*, 1214*b* and an outer boundary line 1215; 1215*a*, 1215*b* of the inner race linear track may be formed in a direction perpendicular to the imaginary extension line SL2.

Meanwhile, a width direction of the outer race linear track 1111; 1111*a*, 1111*b* may be formed in a direction perpendicular to an imaginary extension line SL1 that is formed along the outer race track skew angle (osa).

That is, an inner boundary line 1114; 1114*a*, 1114*b* and an outer boundary line 1115; 1115*a*, 1115*b* of the outer race linear track may be formed in a direction perpendicular to the imaginary extension line SL1.

In FIGS. 21A and 21B, instead of distinguishing between first outer race track, second outer race track, first inner race track, and second inner race track separately, the description will use component terms without ordinal numbers for the outer race track, inner race track, and their sub-components.

As shown in FIG. 21A, the outer race track skew angle (osa) may be formed at a predetermined angle obliquely with respect to a rotation center axis line C2 of the constant velocity joint. A point or starting point where the outer race skew angle (osa) may be formed with respect to the rotation center axis line C2 of the constant velocity joint may become a middle point of the inner boundary line 114 of the outer linear race track.

In particular, a center point of the outer boundary line 1115 of the outer race linear track may become the starting point P1, which may be located at the center of the outer race track.

As shown in FIG. 21A, the rotation center axis line C2 of the constant velocity joint and the imaginary extension line SL1 formed along the outer race track skew angle (osa) may intersect at the center of the inner boundary line 1114 of the outer linear race track. Here, the intersection point or starting point P1 may be indicated by a small dot.

And, a width direction of the outer race linear track 111 may be formed in a direction perpendicular to the imaginary extension line SL1 formed along the outer race track skew angle (osa).

That is, the inner boundary line 1114 and the outer boundary line 1115 of the outer race linear track may be formed in a direction perpendicular to the imaginary extension line SL1.

As shown in FIG. 21B, an inner race track skew angle (isa) may be formed at a predetermined angle obliquely with respect to the rotation center axis line C2 of the constant velocity joint. A point or starting point P2 where the inner race track skew angle (isa) may be formed becomes the outer boundary line 1215 of the inner linear race track, and in particular, a center point of the outer boundary line 1215 of the inner race linear track may become the starting point P2, which may be located at the center of the inner race track.

The rotation center axis line C2 of the constant velocity joint and the imaginary extension line SL2 formed along the inner race track skew angle (isa) may intersect at the center of the outer boundary line 1215 of the inner linear race track.

Here, the intersection point or starting point P2 may be indicated by a small dot.

As described above, the angular amounts of the outer race track skew angle (osa) and the inner race track skew angle (isa) of the opposing outer race track 1110 and inner race track 1210 should be identical, and their directions should be arranged in a crossed direction with respect to each other.

That is, the outer race track 1110 and the inner race track 1210 should be arranged to intersect each other along oblique directions that are symmetrically inclined with respect to the rotation center axis line C2 of the constant velocity joint.

And, the outer race linear track 1111 may be formed in a direction perpendicular to the imaginary extension line SL1 that is formed along the outer race track skew angle (osa).

At this time, the position of point P1—the intersection point or starting point where the rotation center axis line C2 of the constant velocity joint may intersect with the imaginary extension line SL1 formed along the outer race track skew angle—may be preferably arranged more outwardly (toward the outside of the outer cup portion) than the position of point P2—the intersection point or starting point where the rotation center axis line C2 may intersect with the imaginary extension line SL2 formed along the inner race track skew angle (isa).

Figure 22:
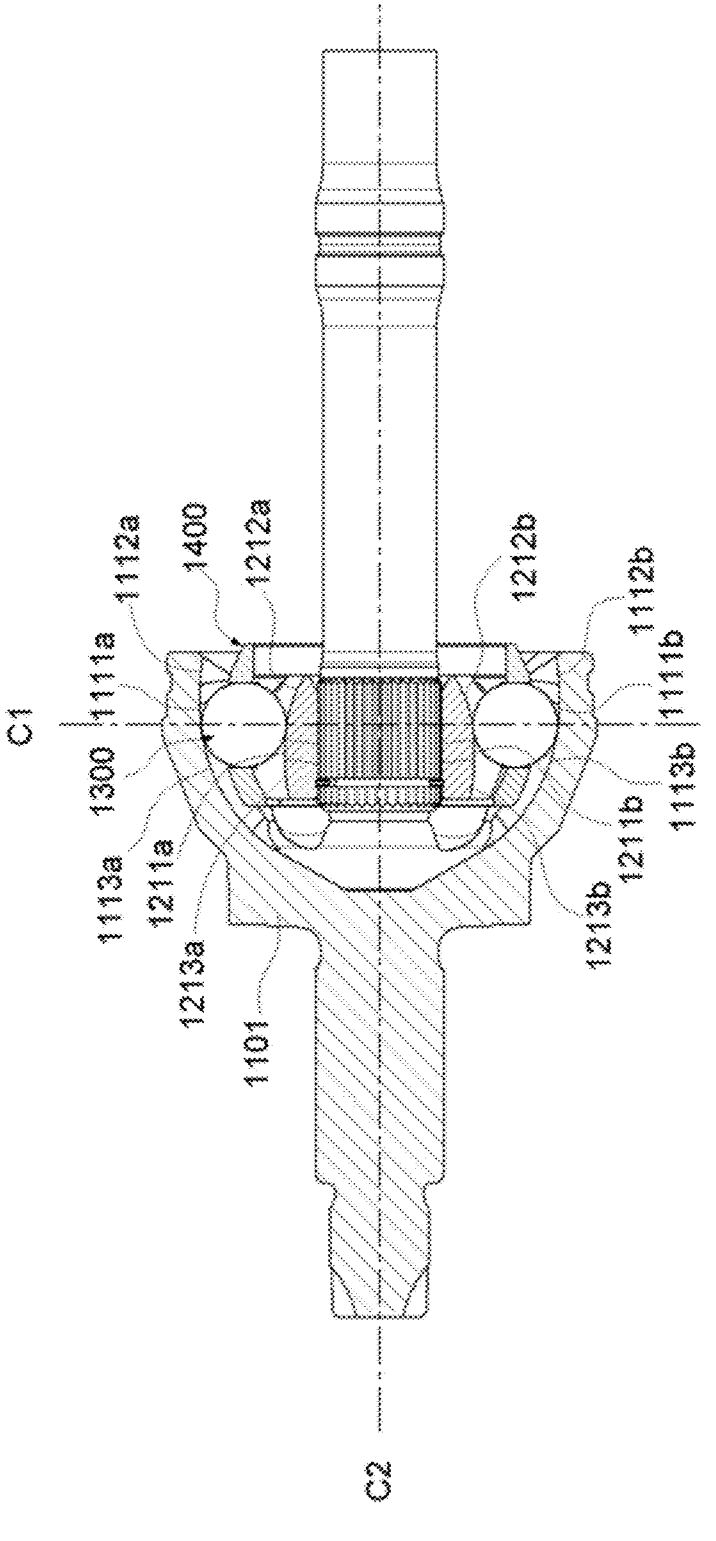
FIG. 22 is a side sectional view showing a state where the constant velocity joint is not angularly articulated in the second embodiment of the present disclosure.
Figure 23:
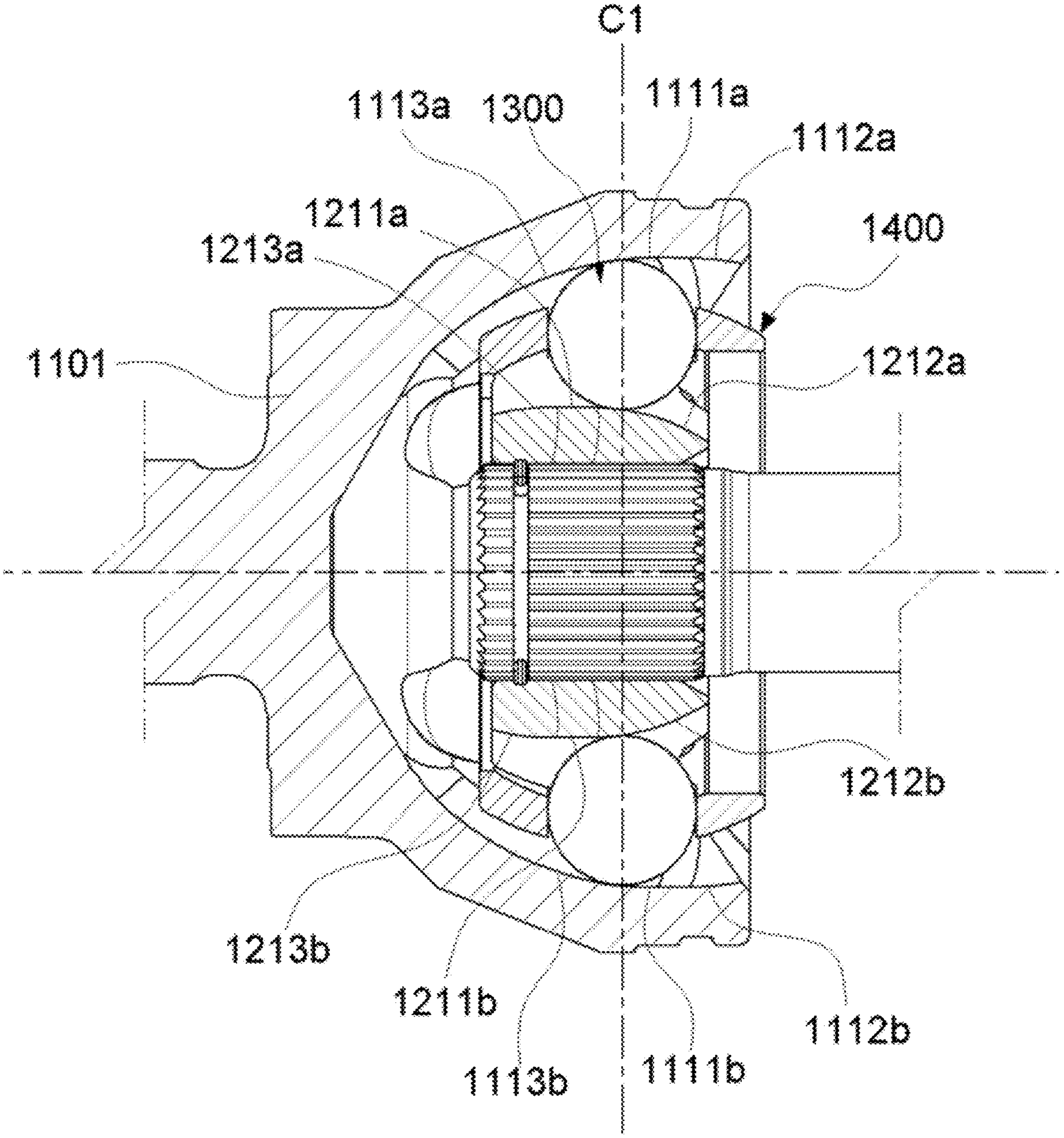
FIG. 23 is an enlarged side sectional view of FIG. 22.

As shown in FIGS. 22 and 23, in a state where no articulation is made, compared to the vertical center C1 of the constant velocity joint, i.e., the vertical line of the rotation center of the virtual constant velocity plane (homokinetic plane) that may be implemented by the center points of the balls, the outer race linear tracks 1111; 1111*a*, 1111*b* may be positioned more outwardly from the vertical center C1 of the constant velocity joint toward the outside of the cup portion 1101, and the inner race linear tracks 1211; 1211*a*, 1211*b* may be positioned more inwardly from the vertical center C1 of the constant velocity joint toward the inside of the cup portion 1101.

And, in a state where no articulation is made, the imaginary line formed by the vertical center C1 of the constant velocity joint may be arranged on the inner curved tracks 1113; 1113*a*, 1113*b* of the outer race and the outer curved tracks 1212; 1212*a*, 1212*b* of the inner race.

And, in a state where the constant velocity joint is not articulated, the outer race linear tracks 1111; 1111*a*, 1111*b* may be provided to face the inner race outer curved tracks 1212; 1212*a*, 1212*b*, and the inner race linear tracks 1211; 1211*a*, 1211*b* may be provided to face the outer race inner curved tracks 1113; 1113*a*, 1113*b*.

Figure 24:
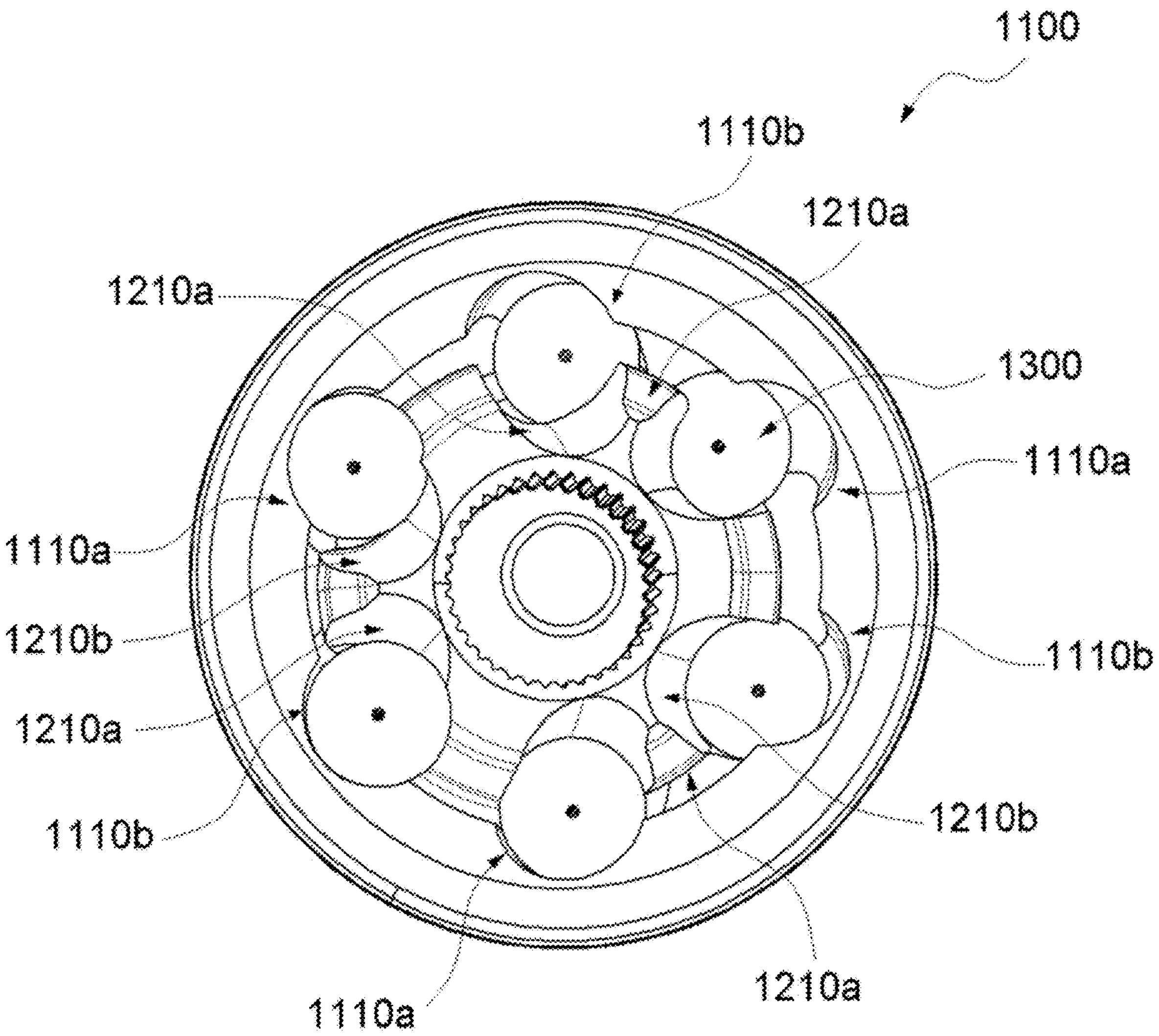
FIG. 24 is a front view of the constant velocity joint according to the second embodiment of the present disclosure.

As shown in FIG. 24, as described above, when the facing outer race tracks 1110; 1110*a*, 1110*b* and inner race tracks 1210; 1210*a*, 1210*b* are arranged in a crossed direction relative to each other, when viewed from the front, the ball 1300 is partially hidden.

The direction (outer race track skew angle direction) in which each outer race track 1110; 1110*a*, 1110*b* extends and the direction (inner race track skew angle direction) in which each facing inner race track 1210; 1210*a*, 1210*b* extends are formed to be crossed relative to each other.

Figure 25A:
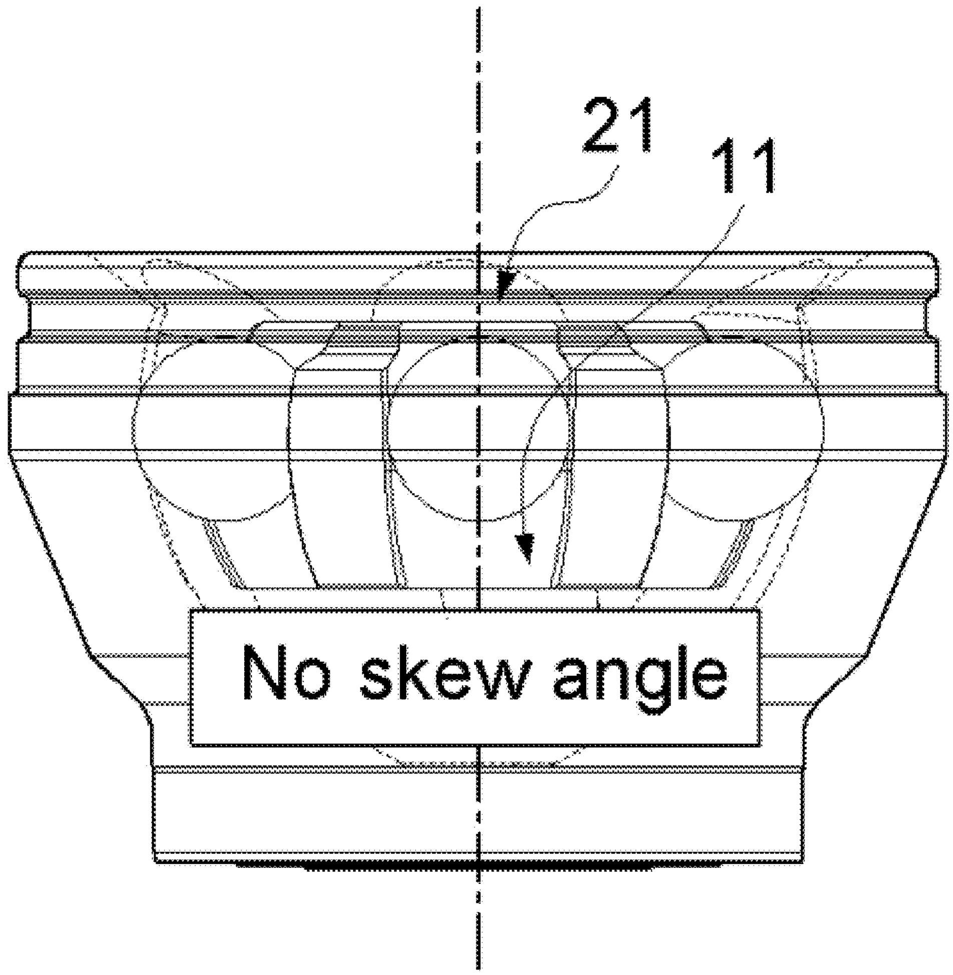
FIG. 25A is a perspective side view showing the track shape of the constant velocity joint without skew angle.
Figure 25B:
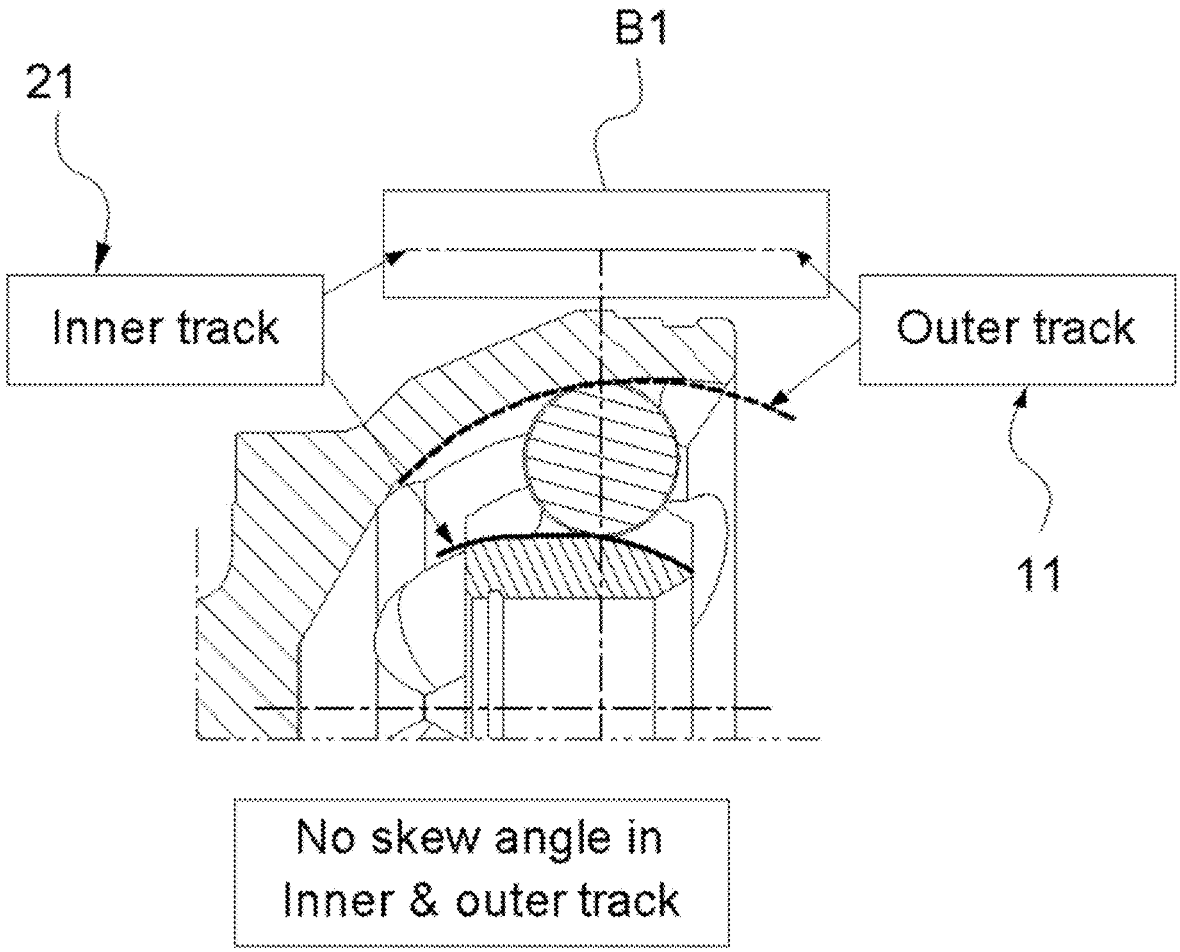
FIG. 25B is a side sectional view showing the track shape of the constant velocity joint without skew angle.
Figure 25C:
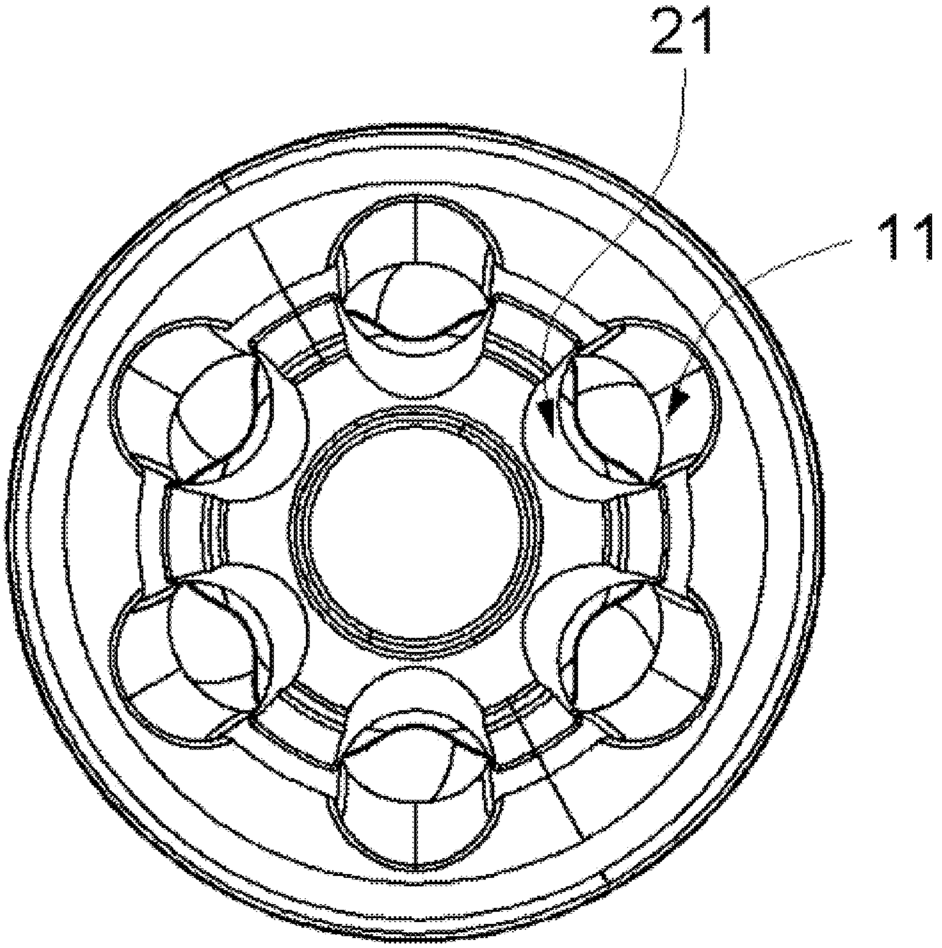
FIG. 25C is a front view showing the track shape of the constant velocity joint without skew angle.

As shown in FIGS. 25A to 25C as a comparative example, when there is no skew angle, the inner race track 21 and the outer race track 11 are arranged in a straight line parallel to each other and are arranged to overlap in a straight line, and when viewed from the front, the space formed by the inner race track 21 and the outer race track 11 forms an almost circular shape.

In FIG. 25B, the upper rectangular box B1 is a simplified plan view representation showing a state where the arrangement directions of the inner race track 21 and the outer race track 11 are aligned in the plan view.

Figure 26A:
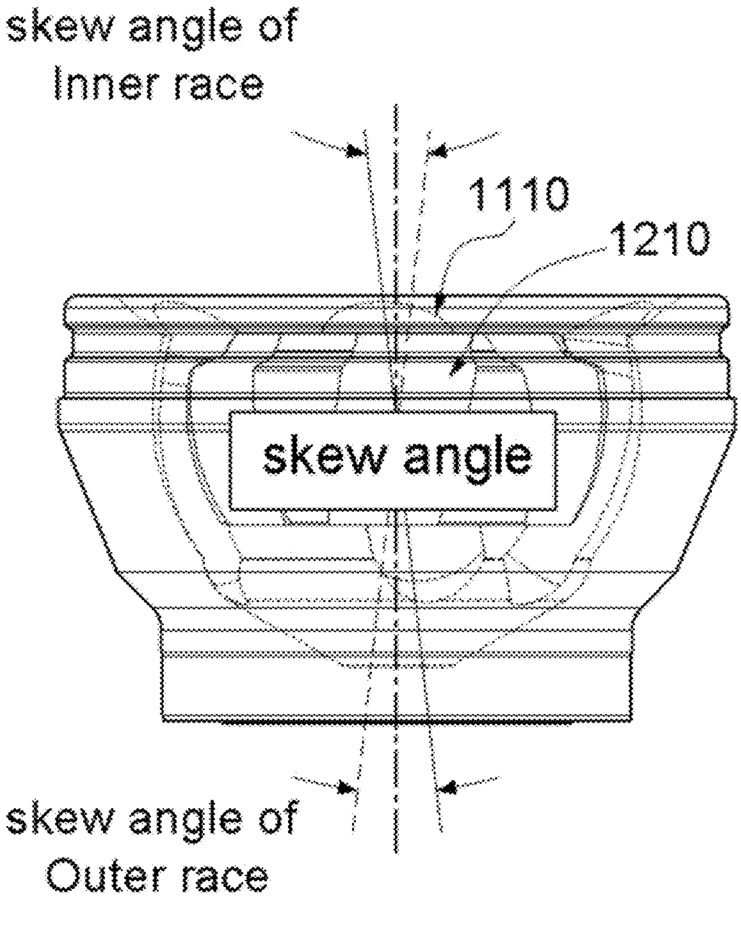
FIG. 26A is a perspective side view showing the track shape of the constant velocity joint with skew angle.
Figure 26B:
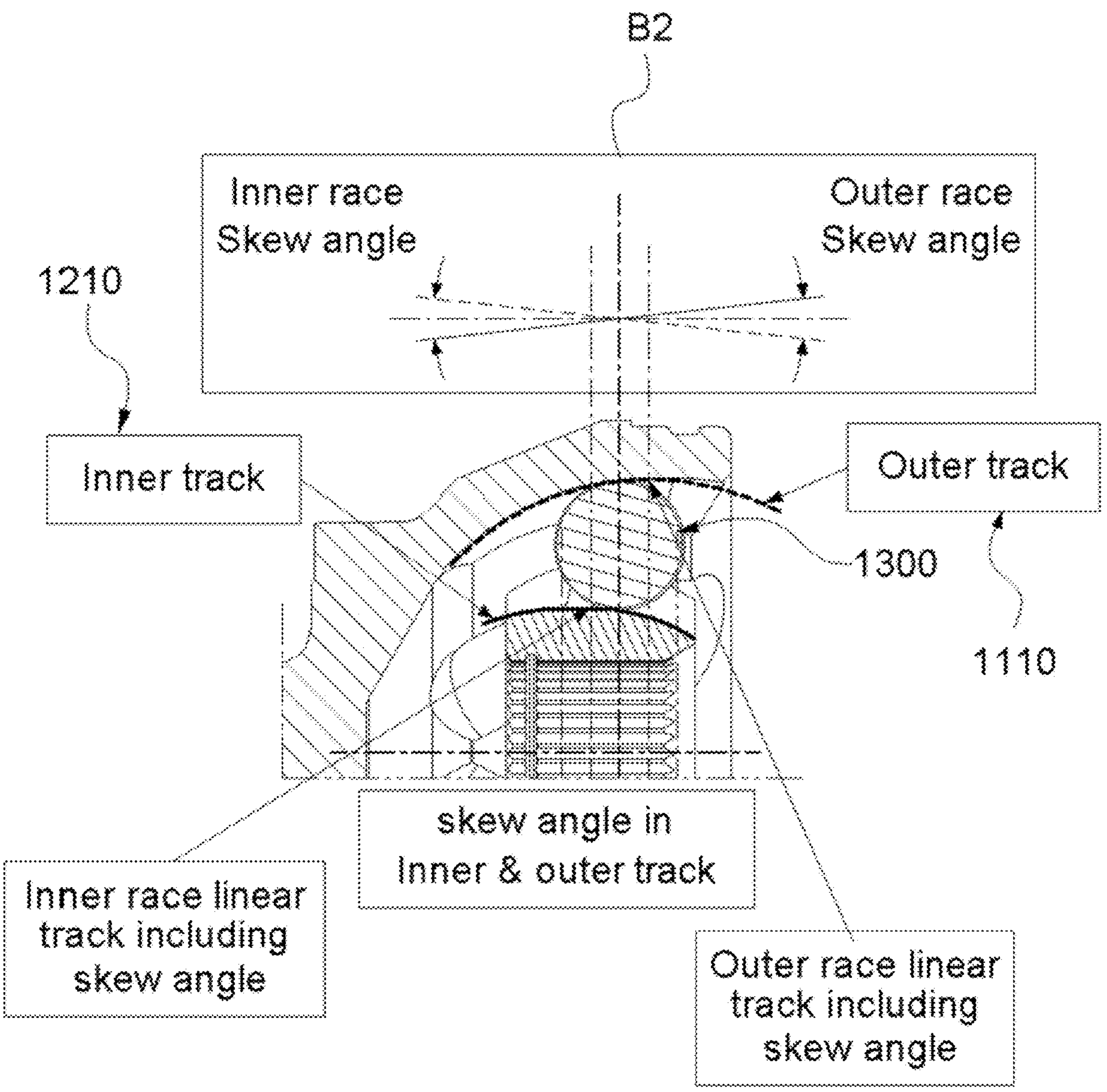
FIG. 26B is a side sectional view showing the track shape of the constant velocity joint with skew angle.
Figure 26C:
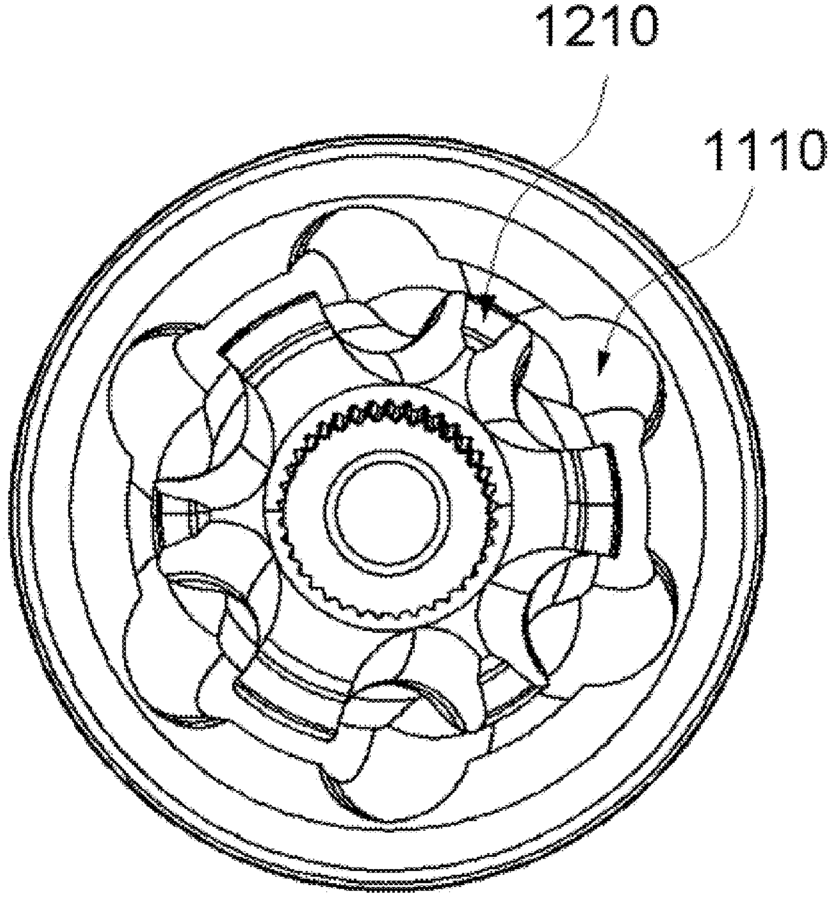
FIG. 26C is a front view showing the track shape of the constant velocity joint with skew angle.

However, as shown in FIGS. 26A to 26C, in the case of the present disclosure comprising the inner race track 1210 arranged obliquely according to the inner race track skew angle and the outer race track 1110 arranged obliquely according to the outer race track skew angle and intersecting with the inner race track 1210, imaginary lines extended along the inner race track skew angle and imaginary lines extended along the outer race track skew angle may intersect with each other.

In FIG. 26B, the upper rectangular box B2 shows a state where the inner race skew angle and the outer race skew angle intersect in the plan view. And the inner race linear track 1211 according to the inner race skew angle and the outer race linear track 1111 according to the outer race skew angle do not overlap with each other in the vertical direction, and the outer race linear track 1111 is arranged outside the inner race linear track 1211.

And, in an unarticulated state, a ball 1300 is arranged between the outer race linear track 1111 and the inner race linear track 1211.

As shown in FIG. 26C, since the inner race track 1210 and the outer race track 1110 may be crossed, the front view of the space formed by the inner race track 1210 and the outer race track 1110 may not take the form of a circular space as shown in FIG. 25C, but rather may take the form of a space that is offset in one direction.

Figure 27:
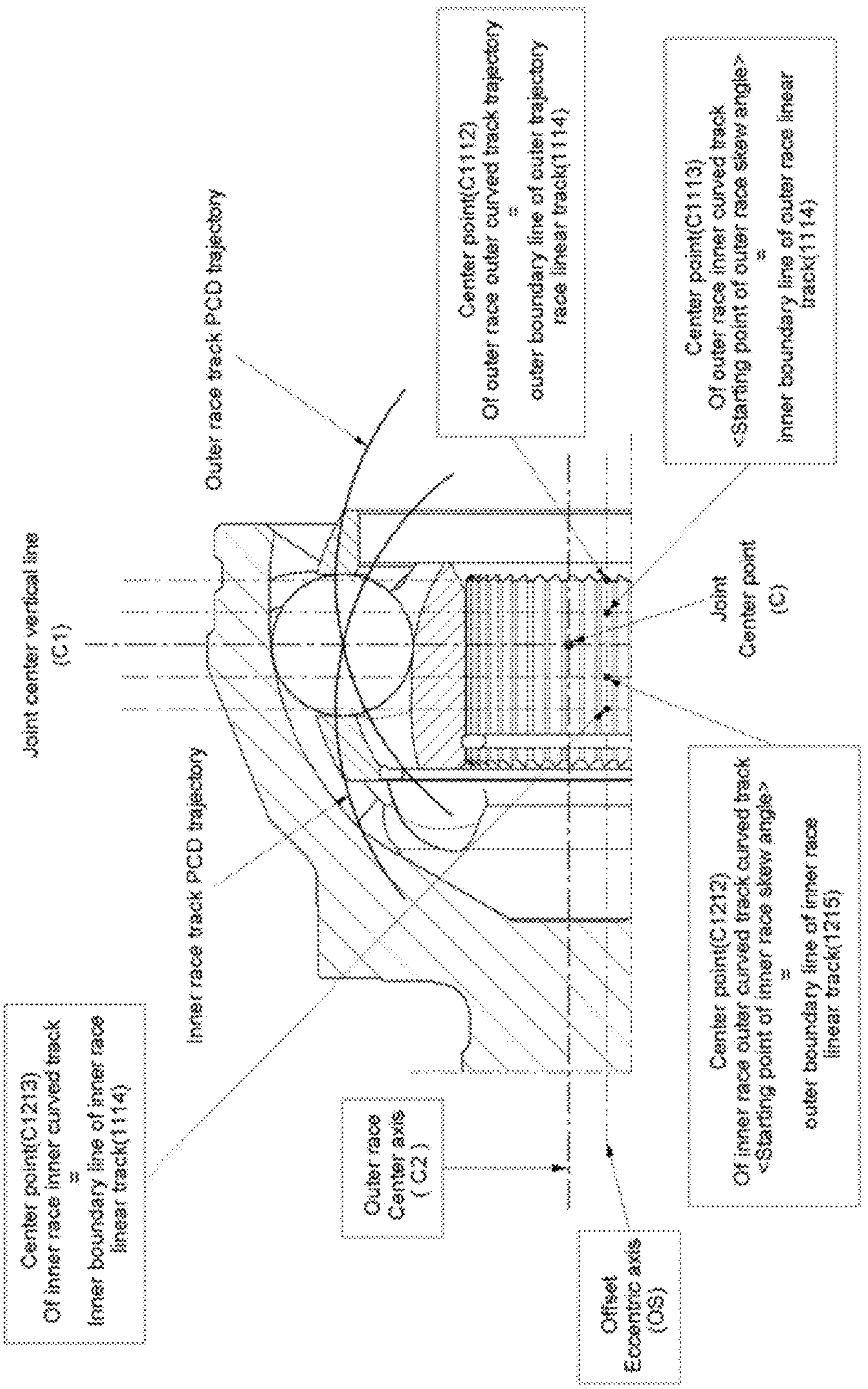
FIG. 27 is a side sectional view showing the shapes of the inner and outer races and the relative positions between each center point in the constant velocity joint according to the second embodiment of the present disclosure.

As shown in FIG. 27, trajectories of the PCD (Pitch Circle Diameter) of the inner race track and the PCD (Pitch Circle Diameter) of the outer race track may be shown.

Figure 28:
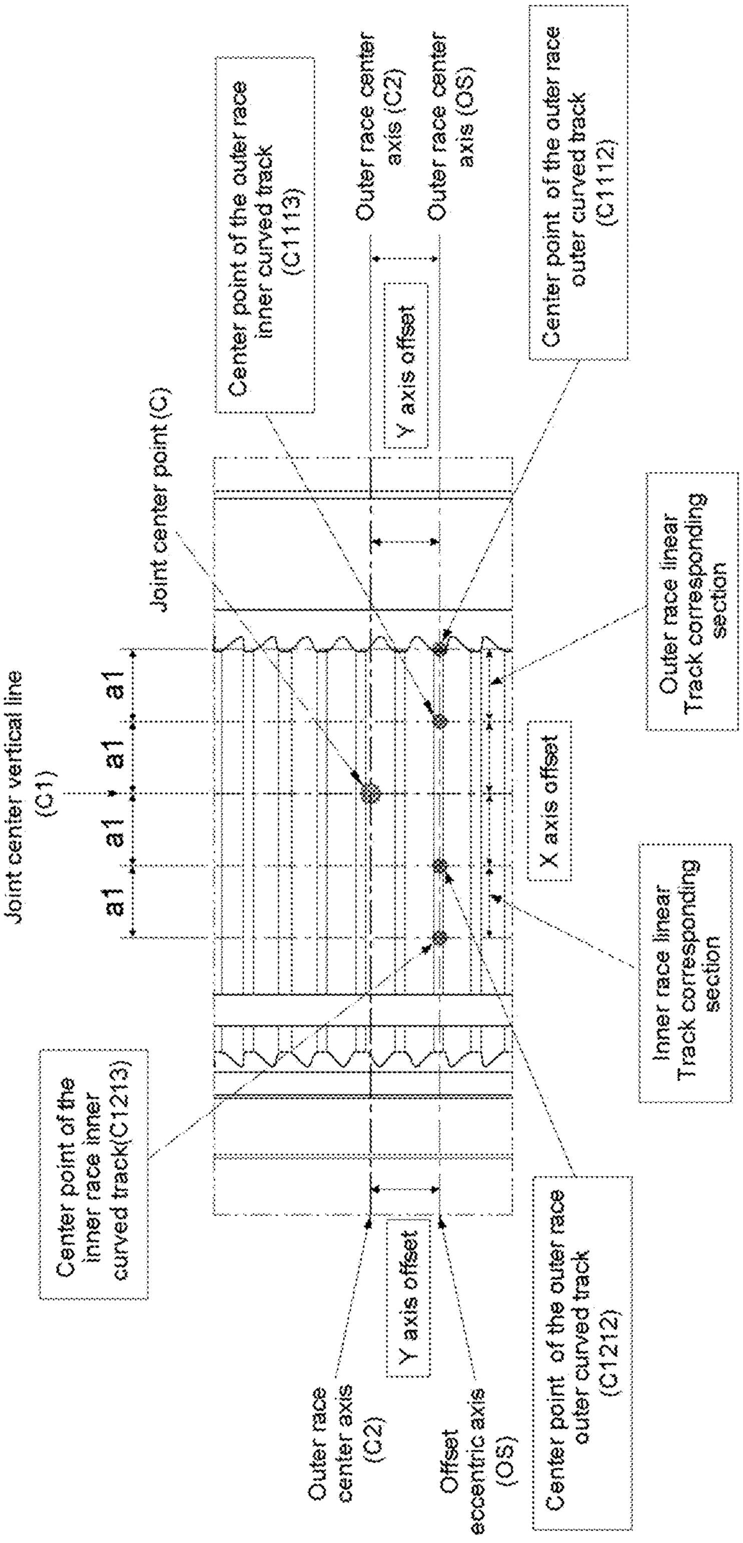
FIG. 28 is a detailed side sectional view showing the positions of each center point in the second embodiment of the present disclosure.

FIGS. 27 and 28 show all of the trajectories of the PCD (Pitch Circle Diameter) of the inner race track, the trajectories of the PCD (Pitch Circle Diameter) of the outer race track, the position of the center point C1212 of the inner race outer curved track, the position of the center point C1213 of the inner race inner curved track, the position of the center point C1113 of the outer race inner curved track, and the position of the center point C1112 of the outer race outer curved track.

The center point C1212 of the inner race outer curved track may be a starting point of the inner race skew angle, and also may be an outer boundary line 1215 of the inner race linear track.

And, the center point C1213 of the inner race inner curved track may be an inner boundary line 1214 of the inner race linear track.

Therefore, between the inner boundary line 1214 of the inner race linear track and the outer boundary line 1215 of the inner race linear track, in the corresponding section (the corresponding section extending downward in the vertical direction), the inner race linear track 1211 is formed, and the section where the inner race linear track 1211 is formed is the same as the section between the center point C1212 of the inner race outer curved track and the center point C1213 of the inner race inner curved track.

Meanwhile, the center point C1113 of the outer race inner curved track may be a starting point of the inner race skew angle, and also may be a boundary line 1114 of the outer race linear track.

And, the center point C1112 of the outer race outer curved track may be an outer boundary line 1115 of the outer race linear track. Therefore, between the inner boundary line 1114 of the outer race linear track and the outer boundary line 1115 of the outer race linear track, in the corresponding section (the corresponding section extending downward in the vertical direction), the outer race linear track 1111 is formed, and the section where the outer race linear track 1111 is formed is the same as the section between the center point C1112 of the outer race outer curved track and the center point C1113 of the outer race inner curved track.

As described above, the inner race outer curved track 1212, the inner race inner curved track 1213, the outer race outer curved track 1112, and the outer race inner curved track 1113 are all formed in a curved surface (or cross-section is curved) shape.

Here, the center point of each track refers to the rotational center of the base material of the outer race and inner race when machining the curved surface track with a milling machine.

In other words, the center point can be considered as the rotational center point of the material for machining the curved surface of the track.

Figure 29:
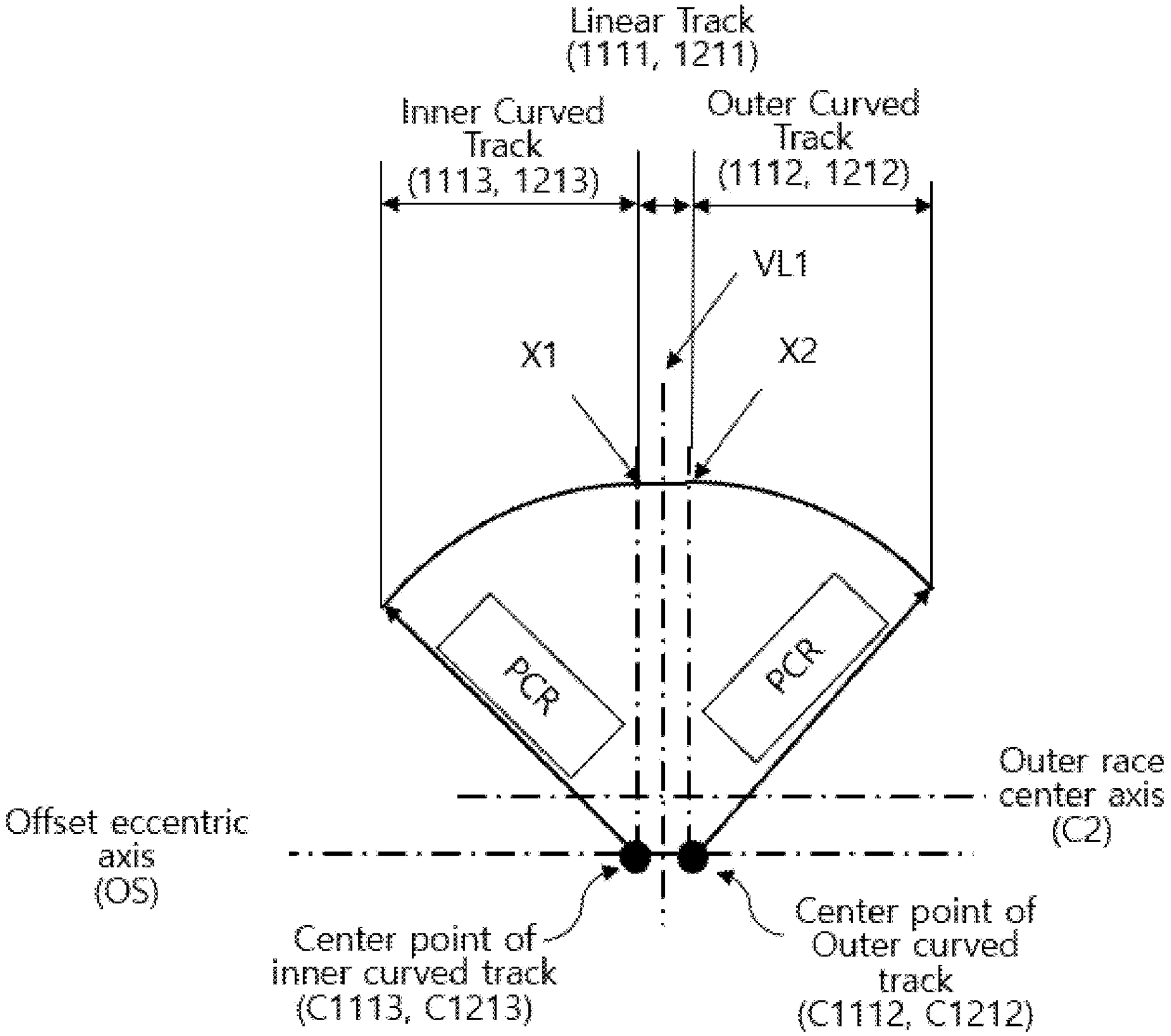
FIG. 29 is a schematic view of the inner curved track, linear track, outer curved track, and the center points of the inner curved track and outer curved track in the second embodiment of the present disclosure.

In other words, FIG. 29 is a drawing that defines the outer curved tracks 1112, 1212 and inner curved tracks 1113, 1213 commonly applied to both the inner race track 1210 and outer race track 1110, the linear tracks 1111, 1211 arranged between them, and the positions of the center points C1113, C1213 of the inner curved tracks and the positions of the center points C1112, C1212 of the outer curved tracks.

The inner race track 1210 and outer race track 1110 may both include outer curved tracks 1112, 1212 and inner curved tracks 1113, 1213, and linear tracks 1111, 1211 arranged between them.

The center points C1113, C1213 of the inner curved tracks and the center points C1112, C1212 of the outer curved tracks may be spaced apart from each other.

An offset eccentric axis OS may be formed at a predetermined distance in a vertical axis direction, that is, in a y-axis direction, on an outer race center axis C2 where the joint center is located, and the center points C1113, C1213 of the inner curved tracks and the center points C1112, C1212 of the outer curved tracks may be respectively arranged on the offset eccentric axis OS.

And, the x-axis coordinate of the center points C1113, C1213 of the inner curved tracks is identical to the x-axis coordinate of points X1 where the inner curved tracks meet the linear tracks, and the x-axis coordinate of the center points of the outer curved tracks is identical to the x-axis coordinate of points X2 where the outer curved tracks meet the linear tracks.

And, the center points C1113, C1213 of the inner curved tracks and the center points C1112, C1212 of the outer curved tracks may be symmetrical in the x-axis direction while maintaining the same distance with respect to an imaginary vertical line VL1 passing vertically through the center of the linear tracks 1111, 1211.

The center points C1113, C1213 of the inner curved tracks and the center points C1112, C1212 of the outer curved tracks may be spaced apart by a distance of half of a1 (a½) from each imaginary vertical line VL1, respectively, and may be symmetrical in the x-axis direction with respect to the imaginary vertical line VL1.

As shown in FIGS. 27 and 28, the center point C1112 of the outer race outer curved track, the center point C1113 of the outer race inner curved track, the center point C1212 of the inner race outer curved track, and the center point C1213 of the inner race inner curved track may be arranged on an offset eccentric axis OS spaced apart from the center axis C2 of the outer race by a first distance in a vertical direction.

And, the X-axis section between the center point C1112 of the outer race outer curved track and the center point C1113 of the outer race inner curved track is equal to the X-axis section of the outer race linear track 1111, and the X-axis section between the center point C1212 of the inner race outer curved track and the center point C1213 of the inner race inner curved track is equal to the X-axis section of the inner race linear track 1211.

Meanwhile, a joint center point C may be positioned on the center axis C2 of the outer race, and as described above, the joint center point C may be defined as a center point of a virtual constant velocity plane (homokinetic plane) formed by center points of the balls, and the center point C1113 of the outer race inner curved track may have a horizontal offset by a first distance a1 outwardly with respect to the joint center point C and a vertical offset by the first distance a1 in a vertical direction opposite to a corresponding outer race track 1110.

And, the center point C1112 of the outer race outer curved track may have a horizontal offset by the first distance a1 outwardly in a horizontal direction with respect to the center point C1113 of the outer race inner curved track along the offset eccentric axis OS.

Also, in a state where the joint center point C is positioned on the center axis C2 of the outer race, the center point C1112 of the outer race outer curved track may have a horizontal offset by the first distance a1 inwardly in a horizontal direction with respect to the joint center point C and a vertical offset by the first distance a1 in a vertical direction opposite to the inner race track.

And, the center point C1213 of the inner race inner curved track may have a horizontal offset by the first distance a1 inwardly in a horizontal direction with respect to the center point C1212 of the inner race outer curved track along the offset eccentric axis.

Therefore, in summary, based on a joint center vertical line C1 passing vertically through the joint center point C, the center point C1113 of the outer race inner curved track is spaced apart by the first distance a1 outwardly along the offset eccentric axis OS, and the center point C1212 of the inner race outer curved track is spaced apart by the first distance a1 inwardly along the offset eccentric axis OS, thereby forming a horizontally symmetric state spaced apart by the first distance a1 with the joint center vertical line C1 therebetween.

Also, based on a joint center vertical line C1 passing vertically through the joint center point C, the center point C1112 of the outer race outer curved track is spaced apart by twice the first distance a1 outwardly along the offset eccentric axis OS.

The center point C1213 of the inner race inner curved track is spaced apart by twice the first distance a1 inwardly along the offset eccentric axis OS, thereby forming a horizontally symmetric state spaced apart by twice the first distance a1 with the joint center vertical line C1 therebetween.

That is, based on the joint center vertical line C1, along the offset eccentric axis OS, the center point C1113 of the outer race inner curved track is located at a position spaced apart by the first distance a1 outwardly, and the center point C1112 of the outer race outer curved track is located at a position spaced apart by the first distance a1 further outwardly from the center point C1113 of the outer race inner curved track.

Also, based on the joint center vertical line C1, along the offset eccentric axis OS, the center point C1212 of the inner race outer curved track is located at a position spaced apart by the first distance a1 inwardly, and the center point C1213 of the inner race inner curved track is located at a position spaced apart by the first distance a1 further inwardly from the center point C1212 of the inner race outer curved track.

And, the outer race center axis C2 and the offset eccentric axis OS are spaced apart by the first distance a1.

Therefore, the center point C1112 of the outer race outer curved track, the center point C1113 of the outer race inner curved track, the center point C1212 of the inner race outer curved track, and the center point C1213 of the inner race inner curved track all maintain a state offset along the y-axis by the first distance in the opposite direction of their respective inner race track and outer race track relative to the outer race center axis C2.

While maintaining the above-described offsets, the outer race track 1110 is obliquely arranged along the outer race skew angle line starting from the outer race skew angle starting point (that is, the point which is both the center point C1113 of the outer race inner curved track and a point on the outer race straight track inner boundary line 1114).

Also, the inner race track 1210 is obliquely arranged along the outer race skew angle line starting from the inner race skew angle starting point (that is, the point which is both the center point C1212 of the inner race outer curved track and a point on the inner race straight track outer boundary line 1215).

Since an oblique line (Skew angle line) is longer than a straight line, as the ball's travel distance along the combination of skewed intersecting tracks in the present disclosure becomes greater than the ball's travel distance along the combination of straight inner/outer race tracks as shown in FIGS. 25A to 25C, the amount of truncation can be larger than in the case of FIGS. 25A to 25C.

Figure 30:
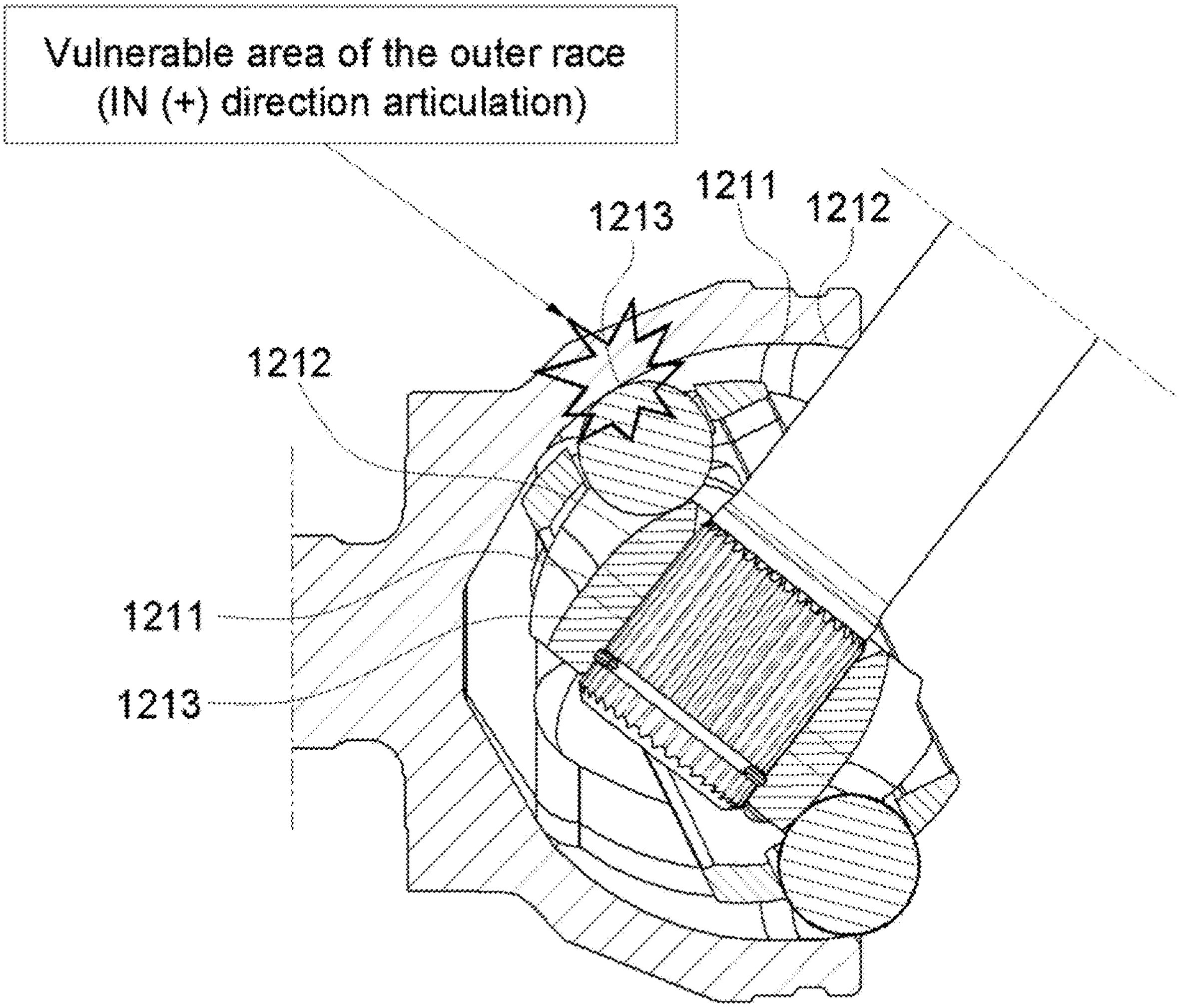
FIG. 30 is a side sectional view showing a maximum angular articulation state in the IN direction (+) in the second embodiment of the present disclosure.
Figure 31:
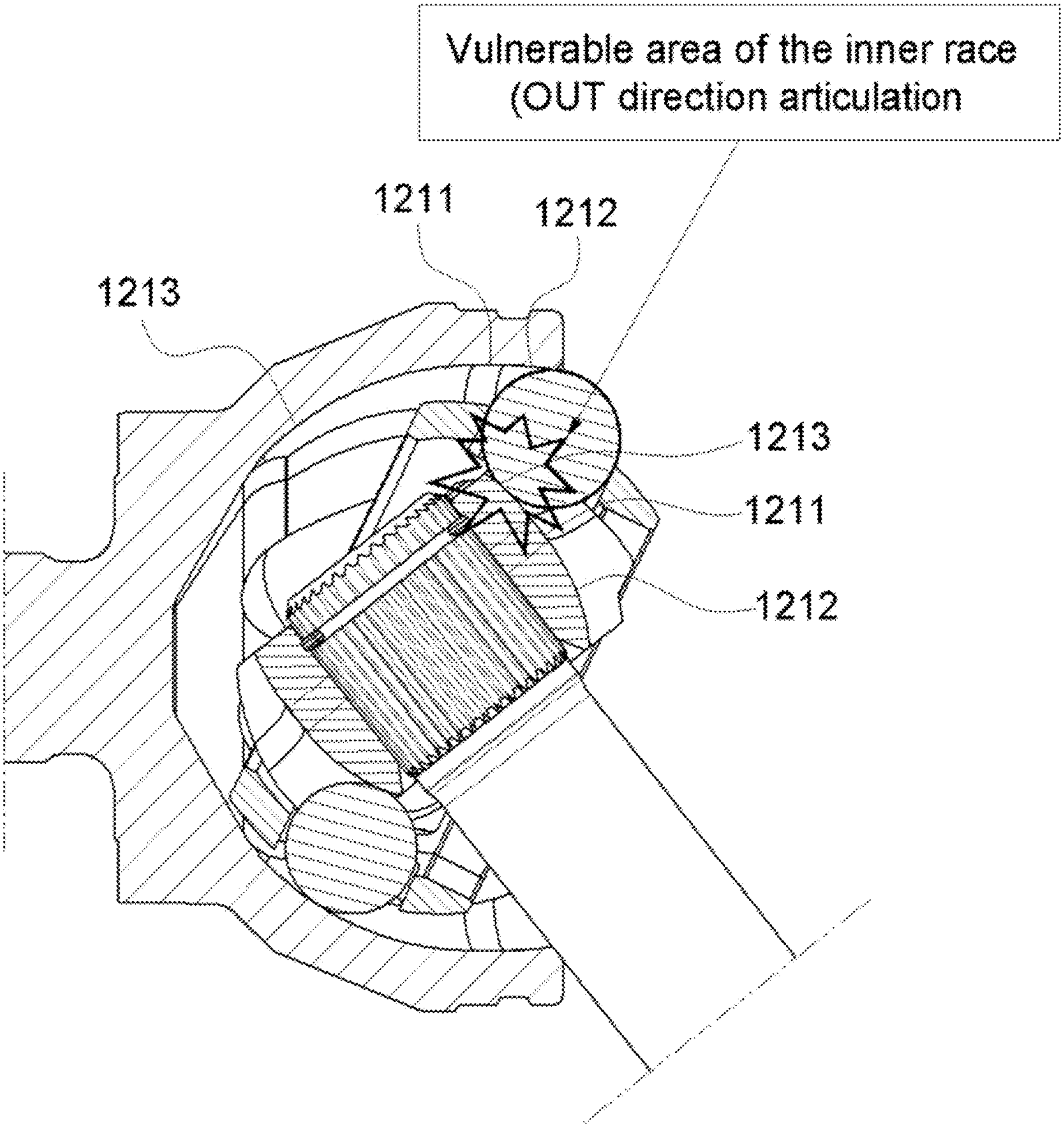
FIG. 31 is a side sectional view showing a maximum angular articulation state in the OUT direction (−) in the second embodiment of the present disclosure.

Referring to FIGS. 30 and 31, cross-sectional views of the joint of the present disclosure are shown at different articulation angles. Specifically, FIG. 30 shows the joint articulated at an angle of +52 degrees, while FIG. 31 shows the joint articulated at an angle of −52 degrees. During articulation in the IN(+) direction, the outer race inner curved track is subjected to substantial compressive forces from the balls. Conversely, when the joint is articulated in the OUT (−) direction, the inner race inner curved track experiences significant compressive forces from the balls.

Consequently, for articulation in the IN(+) direction, it is essential to conduct performance evaluations primarily focusing on the interaction between the the outer race inner curved track and the balls. In contrast, for articulation in the OUT(−) direction, performance evaluations must primarily focus on the interaction between the the inner race inner curved track and the balls, as these interactions become the critical factors in determining joint performance.

Although the present disclosure has been described in connection with the preferred embodiments illustrated in the accompanying drawings, it should be understood that these embodiments are provided for illustrative purposes only. One of ordinary skill in the art would readily appreciate that various modifications and equivalent embodiments are possible from the detailed description provided herein without departing from the spirit and scope of the disclosure.

The true scope of the present disclosure should therefore be determined by the technical spirit of the claims that follow, rather than by the foregoing description.

What is claimed is:

1. A symmetric double offset constant velocity joint comprising:

an outer race having outer tracks formed on an inner surface thereof;

an inner race having inner tracks formed on an outer surface thereof;

balls disposed between the outer race and the inner race; and a cage disposed between the outer race and the inner race for retaining the balls, wherein the outer race tracks include:

an outer race linear track, an outer race outer curved track formed outside the outer race linear track, and an outer race inner curved track formed inside the outer race linear track, wherein the inner race tracks include:

an inner race linear track, an inner race outer curved track formed outside the inner race linear track, and an inner race inner curved track formed inside the inner race linear track, wherein center points of the outer race outer curved track, the outer race inner curved track, the inner race outer curved track, and the inner race inner curved track are arranged on an offset eccentric axis line spaced apart from a center axis of the outer race by a first distance in a vertical direction.

2. The symmetric double offset constant velocity joint of claim 1, wherein when the constant velocity joint is not articulated:

the outer race linear track is arranged to face the inner race outer curved track, and the inner race linear track is arranged to face the outer race inner curved track.

3. The symmetric double offset constant velocity joint of claim 1, wherein:

a joint center point is located on the center axis of the outer race, the joint center point is defined as a center point of a virtual homokinetic plane formed by center points of the balls, and the center point of the outer race inner curved track has a horizontal offset of the first distance outward and a vertical offset of the first distance in a direction opposite to the outer race tracks with respect to the joint center point.

4. The symmetric double offset constant velocity joint of claim 3, wherein:

the center point of the outer race outer curved track has a horizontal offset of the first distance outward along the offset eccentric axis line with respect to the center point of the outer race inner curved track.

5. The symmetric double offset constant velocity joint of claim 1, wherein:

a joint center point is located on the center axis of the outer race, and the center point of the inner race outer curved track has a horizontal offset of the first distance inward with respect to the joint center point, and a vertical offset of the first distance in a direction opposite to the inner race tracks with respect to the joint center point.

6. The symmetric double offset constant velocity joint of claim 5, wherein:

the center point of the inner race inner curved track has a horizontal offset of the first distance inward along the offset eccentric axis line with respect to the center point of the inner race outer curved track.

7. The symmetric double offset constant velocity joint of claim 1, wherein:

an arrangement section of the inner race linear track corresponds to a section between the center point of the inner race outer curved track and the center point of the inner race inner curved track, and has a length equal to the first distance, and an arrangement section of the outer race linear track corresponds to a section between the center point of the outer race outer curved track and the center point of the outer race inner curved track, and has a length equal to the first distance.

8. A symmetric double offset constant velocity joint comprising:

an outer race having outer tracks formed on an inner surface thereof;

an inner race having inner tracks formed on an outer surface thereof;

balls disposed between the outer race and the inner race; and a cage disposed between the outer race and the inner race for retaining the balls, wherein the outer race tracks include: an outer race linear track, an outer race outer curved track formed outside the outer race linear track, and an outer race inner curved track formed inside the outer race linear track, wherein the inner race tracks include: an inner race linear track, an inner race outer curved track formed outside the inner race linear track, and an inner race inner curved track formed inside the inner race linear track, wherein facing outer race tracks and inner race tracks maintain a crossing state by being arranged at a predetermined skew angle with respect to a rotation center axis of the joint, and wherein center points of the outer race outer curved track, the outer race inner curved track, the inner race outer curved track, and the inner race inner curved track are arranged on an offset eccentric axis line spaced apart from a center axis of the outer race by a first distance in a vertical direction.

9. The symmetric double offset constant velocity joint of claim 8, wherein:

the outer race tracks include a first outer race track and a second outer race track arranged adjacent thereto, the inner race tracks include a first inner race track and a second inner race track arranged adjacent thereto, the first inner race track is arranged obliquely in a first direction with respect to the rotation center axis of the joint to form an inner race track skew angle, and the facing first outer race track is arranged obliquely in a second direction symmetrical to the first direction with respect to the rotation center axis to form an outer race track skew angle, the second inner race track arranged adjacent to the first inner race track is arranged obliquely in the second direction with respect to the rotation center axis to form an inner race track skew angle, and the facing second outer race track is arranged obliquely in the first direction symmetrical to the second direction with respect to the rotation center axis to form an outer race track skew angle.

10. The symmetric double offset constant velocity joint of claim 8, wherein:

the inner race linear track is formed in a direction perpendicular to a virtual extension line formed along the inner race track skew angle, and the outer race linear track is formed in a direction perpendicular to a virtual extension line formed along the outer race track skew angle.

11. The symmetric double offset constant velocity joint of claim 8, wherein:

the inner race linear track is arranged between an inner race linear track outer boundary line forming a boundary with the inner race outer curved track and an inner race linear track inner boundary line forming a boundary with the inner race inner curved track, and the inner race track skew angle is formed based on or started from the inner race linear track outer boundary line.

12. The symmetric double offset constant velocity joint of claim 8, wherein:

the outer race linear track is arranged between an outer race linear track outer boundary line forming a boundary with the outer race outer curved track and an outer race linear track inner boundary line forming a boundary with the outer race inner curved track, and the outer race track skew angle is formed based on or started from the outer race linear track inner boundary line.

13. The symmetric double offset constant velocity joint of claim 8, wherein:

when the joint is not articulated, the outer race linear track is arranged to face the inner race outer curved track, and the inner race linear track is arranged to face the outer race inner curved track.

14. The symmetric double offset constant velocity joint of claim 8, wherein:

the center point of the inner race inner curved track is a starting point of the inner race track skew angle, and the center point of the outer race inner curved track is a starting point of the outer race track skew angle.

15. The symmetric double offset constant velocity joint of claim 8, wherein:

an X-axis section between the center point of the outer race outer curved track and the center point of the outer race inner curved track is equal to an X-axis section of the outer race linear track.

16. The symmetric double offset constant velocity joint of claim 8, wherein:

an X-axis section between the center point of the inner race outer curved track and the center point of the inner race inner curved track is equal to an X-axis section of the inner race linear track.

17. The symmetric double offset constant velocity joint of claim 8, wherein:

a joint center point is located on the outer race center axis, the joint center point is defined as a center point of a virtual homokinetic plane formed by center points of the balls, the center point of the outer race inner curved track, which is also the starting point of the outer race track skew angle, has a horizontal offset of the first distance outward and a vertical offset of the first distance in a direction opposite to the outer race track with respect to the joint center point, and the center point of the outer race outer curved track has a horizontal offset of the first distance outward on the offset eccentric axis line with respect to the center point of the outer race inner curved track.

18. The symmetric double offset constant velocity joint of claim 8, wherein:

a joint center point is located on the outer race center axis, the center point of the outer race outer curved track, which is also the starting point of the inner race track skew angle, has a horizontal offset of the first distance inward and a vertical offset of the first distance in a direction opposite to the inner race track with respect to the joint center point, and the center point of the inner race inner curved track has a horizontal offset of the first distance inward on the offset eccentric axis line with respect to the center point of the inner race outer curved track.

19. The symmetric double offset constant velocity joint of claim 8, wherein:

an arrangement section of the inner race linear track corresponds to and has a length equal to the first distance between the center point of the inner race outer curved track and the center point of the inner race inner curved track, and an arrangement section of the outer race linear track corresponds to and has a length equal to the first distance between the center point of the outer race outer curved track and the center point of the outer race inner curved track.

* * * * *